United States Patent
Bachmutsky et al.

(10) Patent No.: US 11,640,305 B2
(45) Date of Patent: May 2, 2023

(54) WAKE-UP AND TIMER FOR SCHEDULING OF FUNCTIONS WITH CONTEXT HINTS

(71) Applicant: Intel Corporation, Santa Clara, CA (US)

(72) Inventors: Alexander Bachmutsky, Sunnyvale, CA (US); Kshitij A. Doshi, Tempe, AZ (US); Raghu Kondapalli, San Jose, CA (US); Vadim Sukhomlinov, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 677 days.

(21) Appl. No.: 16/524,004

(22) Filed: Jul. 26, 2019

(65) Prior Publication Data
US 2021/0026651 A1 Jan. 28, 2021

(51) Int. Cl.
*G06F 9/4401* (2018.01)
*G06F 3/06* (2006.01)
*G06F 9/48* (2006.01)

(52) U.S. Cl.
CPC .......... *G06F 9/4418* (2013.01); *G06F 3/0626* (2013.01); *G06F 3/0653* (2013.01); *G06F 3/0673* (2013.01); *G06F 9/4881* (2013.01)

(58) Field of Classification Search
CPC .... G06F 3/0626; G06F 3/0653; G06F 3/0673; G06F 9/4881
See application file for complete search history.

(56) References Cited

U.S. PATENT DOCUMENTS

| | | | |
|---|---|---|---|
| 9,361,155 B2* | 6/2016 | Chandhoke | G06F 9/4825 |
| 10,592,281 B1* | 3/2020 | Saidi | G06F 9/45533 |
| 2014/0059553 A1 | 2/2014 | Chandhoke | |
| 2014/0129784 A1 | 5/2014 | Chapman et al. | |
| 2018/0239629 A1 | 8/2018 | Tsirkin | |

OTHER PUBLICATIONS

ARM, "ARM DS-5 Using the Debugger: About breakpoints and watch points", Version 5.5, Copyright 2010, 2011 ARM, retrieved: http://infocenter.arm.com/help/topic/com.arm.doc.dui0446e/BEICGIFG.html, 2 pages.

(Continued)

*Primary Examiner* — Tammara R Peyton
(74) *Attorney, Agent, or Firm* — Compass IP Law PC

(57) ABSTRACT

Examples are described that relate to waking up or invoking a function such as a processor-executed application or a hardware device. The application or a hardware device can specify which sources can cause wake-ups and which sources are not to cause wake-ups. A device or processor-executed software can monitor reads from or writes to a region of memory and cause the application or a hardware device to wake-up unless the wake-up is specified as inhibited. The updated region of memory can be precisely specified to allow a pinpoint retrieval of updated content instead of scanning a memory range for changes. In some cases, a write to a region of memory can include various parameters that are to be used by the woken-up application or a hardware device. Parameters can include a source of a wake-up, a timer to cap execution time, or any other information.

23 Claims, 17 Drawing Sheets

(56) References Cited

OTHER PUBLICATIONS

Chaiken, Alison, "IRQs: the Hard, the Soft, the Threaded and the Preemptible", Embedded Linux Conference Europe, Oct. 11, 2016, 59 pages.
Chou, David, "Event-Driven Serverless Architectures", Oct. 15, 2018, retrieved: https://dachou.github.i0/2018/10/15/event-driven-serverless.html, 1 page.
Corbet, Jonathan, "Batch processing of network packets", Aug. 21, 2018, LWN.net, retrieved: https://lwn.net/Articles/763056/, 13 pages.
DPDK, "10. Poll Mode Driver", Data Plane Development Kit 19.11.0 documentation, Copyright 2010-2015 Intel Corporation, retrieved: https://doc.dpdk.org/guides/prog_guide/poll_mode_drv.html, 14 pages.
Intel Software Developer Zone, "How to Use the MONITOR and MWAIT Streaming SIMD Extensions 3 Instructions", Dec. 10, 2008, Next Generation Intel® Processor: Software Developers Guide (/en-us/articles/next-generation-intel-processor-software-developers-guide), 5 pages.
LWN.net, "Virtual-machine scheduling and scheduling in virtual machines", Jul. 10, 2019, retrieved: https://lwn.net/Articles/793375/, 3 pages.
Extended European Search Report for Patent Application No. 20164722.9, dated Dec. 15, 2020, 8 pages.
European First Office Action, (EP Exam Report Article 94(3) EPC), for Patent Application No. 20164722.9, dated Jun. 9, 2022, 7 pages.

* cited by examiner

WAKE-UP AND TIMER FOR SCHEDULING OF FUNCTIONS WITH CONTEXT HINTS

TECHNICAL FIELD

Various examples described herein relate to waking and activating idle applications.

BACKGROUND

Software communities have embraced decentralized approaches for developing complex services from modular synthesis of many simpler microservices and unit functions. This structuring delivers solutions that are loosely coupled, independently deployable and evolvable, highly maintainable and testable, efficiently scalable, and organized to combine best mixes of specific capabilities of different businesses, developers, and service vendors.

Decentralized software architectures (multiple smaller, specialized applications, in place of monolithic solutions) are highly popular particularly for cloud-based delivery. However, there have several inefficiencies, namely, limited density of applications and communication overheads and amplification. Applications communicate significantly with each other in most common workflows. Existing interfaces introduce multiple software levels and operations for marshalling and serialization of data.

BRIEF DESCRIPTION OF THE DRAWINGS

FIGS. 8A-1 to 8A-3 depict processes for programming what events cause a wake-up.

DETAILED DESCRIPTION

Figure 1:
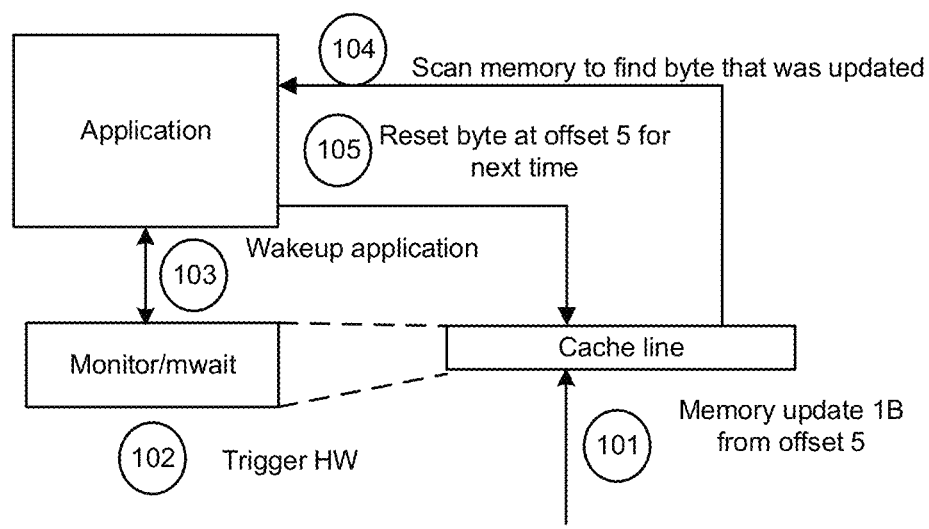
FIG. 1 shows a known manner of waking an application.

Existing methods of application scheduling involve one of the following: a) interrupts, exceptions, or signals (e.g., soft or hard); b) polling for a resource status change, such as poll-mode driver implementations; c) centralized schedulers (e.g., Linux or another operating system (OS) or hypervisor/virtual machine manager (VMM)); d) proprietary schedulers (e.g., various implementations for pool of threads, Java, etc.); and (e) batching of operations; or (f) event-driven execution. Interrupts, exceptions, or signals are not efficient for communication, do not support remote calls, and have limited language and framework support. Exceptions are designed to handle software issues and not suited as a communication mechanism. Signals do not work with remote procedure calls (RPC) and require software polling for implementation. Interrupts and centralized schedulers provide high overhead arising from switching from one context to another context.

Polling can waste central processing unit (CPU) resources and provide low application utilization as only a single application or hardware thread per core is executed for polling. Software polling drains compute resources and limits density of workloads per server. Proprietary schedulers are suited only for their particular environment. Batching of operations provides high latency and low flexibility. Event-driven execution requires use of interrupts with high overhead and latency or software polling to detect events that can waste CPU resources.

MONITOR/MWAIT mechanisms in x86 instruction set architecture compatible CPUs allow software on a given CPU to watch for and receive memory-based notifications. These instructions had been originally designed for power savings to be able to put cores to sleep when not in use. MONITOR/MWAIT allows an application to go idle and be awoken if the application is to do work or process a job. The application monitors a region of memory (e.g., address or cache line) and if there is a memory access to any address within the region, the application wakes up. Memory-based notifications may be used to trigger responsive actions. However, MONITOR/MWAIT has limitations, such as, only a single memory region is monitored, only a single application on a given CPU core can be awoken, and a requirement to check an entire memory range to know which address caused the trigger.

Various embodiments enhance the existing memory monitoring hardware devices to also serve the application scheduling use cases enabling very low overhead for application scheduling that can be applicable in many use cases with traditional virtual machine (VM)-based scheduling (by its support in VMM), container, process, or thread scheduling by implementation in OS schedulers such as Linux, and applicable in environments like function as a service (FaaS).

A virtual machine (VM) can be software that runs an operating system and one or more applications. The virtual machine is defined by specification, configuration files, virtual disk file, non-volatile random access memory (NVRAM) setting file, and the log file and is backed by the physical resources of a host computing platform. A container can be a software package of applications, configurations and dependencies so the applications run reliably on one computing environment to another. Containers can share an operating system installed on the server platform and run as isolated processes.

FIG. 1 shows a known manner of waking an application. Existing MONITOR/MWAIT (e.g., kernel) instructions and corresponding monitoring hardware were designed mainly for power savings when a core that does not need to run can be turned off and awakened when needed using a memory update or interrupt. At action 1, a cache line is updated with 1 byte (1B) at offset 5 from a start of a memory range. At action 2, MONITOR/MWAIT hardware device is triggered to operate by an update to the cache line. At action 3, MONITOR/MWAIT hardware wakes up a target software function. At action 4, if necessary, the application scans the memory to find which byte was updated. Existing schemes do not allow the application to easily figure out the triggered address of the configured address range if the value has not changed. It is assumed here that the application had saved previous memory state for comparison or the memory has been reset to the value known to the application. At action 5, the application resets the byte at offset 5 to a known value for the next wake-up event.

Figure 2A:
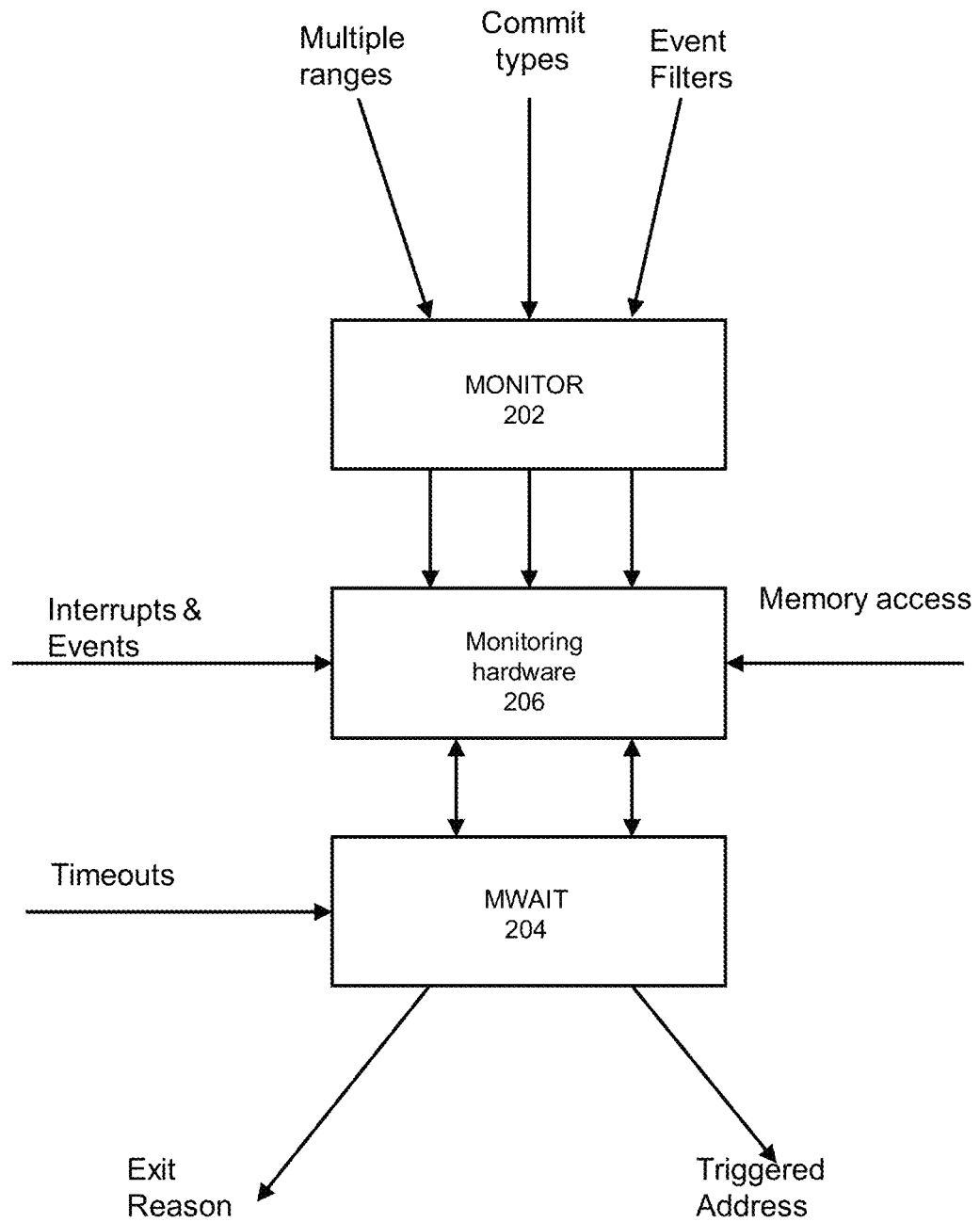
FIG. 2A shows an example system with memory waiting and filtering.

FIG. 2A shows an example system with memory waiting and filtering. The system can attempt to provide for lower latency application wake-ups and efficient central processing unit (CPU) scheduling. A wake up of a function can refer to changing from a sleep or lower power or lower clock frequency of operation to a higher power or high clock frequency of operation. Wake up also refers to invoking an idle application with corresponding application context (registers, states, etc.) that did not run either because of waiting for some event or releasing CPU for the benefit of another application running on the same core. In some embodiments, monitoring devices can be accessed in either or both of kernel-level and user-space calls. A monitoring device can be a MONITOR/MWAIT component. MONITOR hardware can recognize memory based signaling that may initially arise as hardware events (including interrupts) by mapping hardware events to memory ranges (e.g., pseudo memory ranges) over which monitoring is specified. For example, waiting may be complete when either the waited-for access or event happens, or, when a specified amount of time elapses. In some embodiments, a wake-up event indicates one or more of the reason for wake-up and/or a triggering address so that the burden on awoken software to discover a reason for wake-up or a triggering address is removed. In some embodiments, MONITOR hardware can be configured to monitor more than one memory range (e.g., contiguous or non-contiguous). To eliminate needless wake-ups, in some embodiments, MONITOR hardware can be configured using filters or commit types to wake-up (or not wake-up) a target function or device based on the type of memory access or events.

Figure 2B:
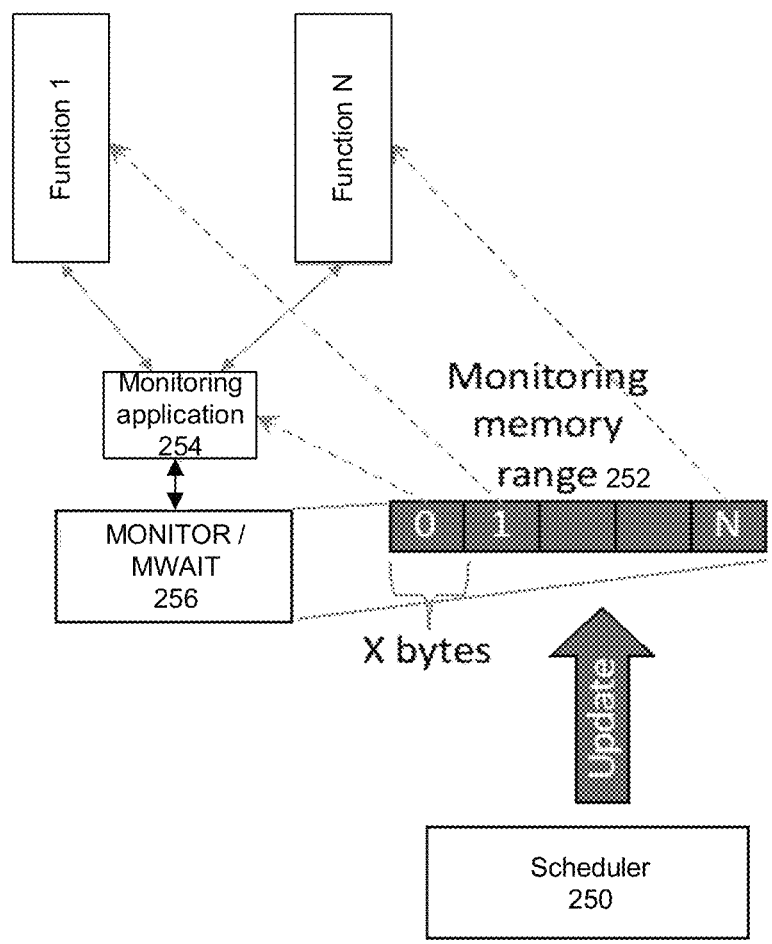
FIG. 2B depicts a use of an application as an intermediary for waking other applications.

FIG. 2B depicts a use of an application as an intermediary for waking other applications. In some embodiments, the system assigns a space to monitoring application 254 (App0), such that the system allows invoking monitoring application 254 directly instead of invoking a particular application, function, or hardware device. In some examples, monitoring application 254 can be used by a function scheduler. There could be multiple benefits from use of monitoring application 254. For example, if there is no triggered address return capability, a target function index can be written directly into the memory space within memory range 252 associated with waking monitoring application 254. After monitoring application 254 is activated, monitoring application 254 can read a value in the updated memory space and then call the target function based on the read value.

For example, monitoring application 254 can run on a core. In some embodiments, monitoring application 254 can be invoked using MONITOR/MWAIT device 256 if there is any update to memory range 252 associated with monitoring application 254. An update to memory range 252 causes wake up of monitoring application 254 and monitoring application 254 reads all bytes in the address range to determine what byte has changed. Depending on a byte number that changed, monitoring application 254 can wake up an associated application (e.g., Function 1 or Function N). For N functions running on the same core, a monitored memory region 252 associated with monitoring application 254 is N*X bytes and each application or function has X dedicated bytes in memory region 252. For example, with 64 applications potentially executing at the same time on a single core and a single byte allocated per application, monitoring application 254 monitors 64 bytes of memory space for updating. Scheduler 250 is capable of updating any of the X bytes that correspond to one of the N applications or functions that has been scheduled to run next. In a very simple case, scheduler 250 can just update the corresponding byte for one of the N applications or functions with a single pre-defined value (e.g., value 1).

Figure 3A:
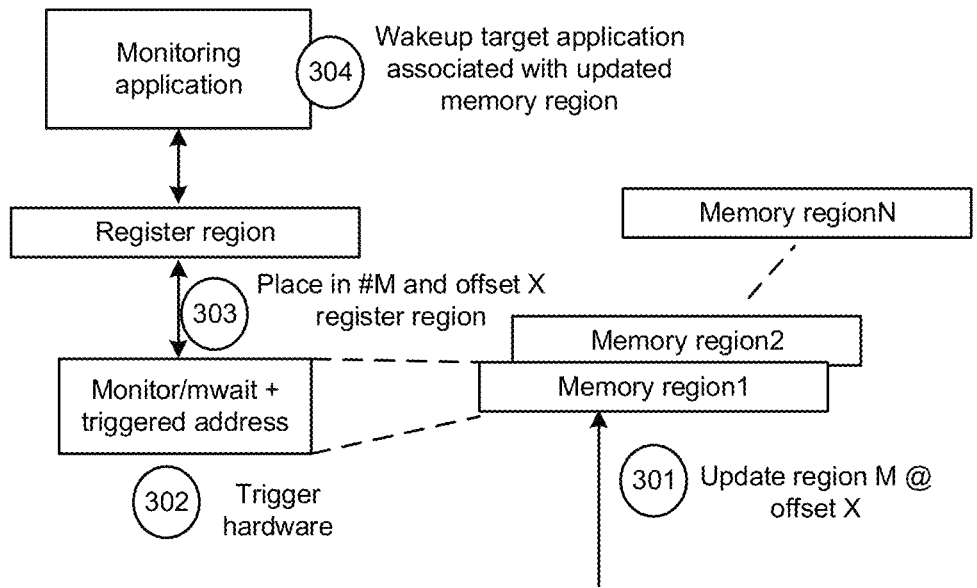
FIG. 3A shows a triggered address return example.

FIG. 3A depicts an example sequence of using a monitoring application to wake up a target function. In some examples, a trigger address (e.g., byte number) can be placed in a register and monitoring application reads merely a particular byte in a monitored address range specified by the trigger address instead of scanning a memory range. For example, if a value of 5 is written into a register associated with monitoring application, monitoring application could merely read a byte position 5 from the byte address range and monitoring application could wake up a target function associated with byte position 5. Monitoring application can act as a proxy or microkernel in user space. For example, monitoring application can be implemented as any or a combination of a processor-executed thread, subroutine, any executable code segment, hardware implemented application scheduler, fixed function device, field programmable gate array (FPGA), and so forth. Without specification of a trigger address return, monitoring application (or application scheduler) would need to scan its entire monitored memory region to identify the specific location had changed or accessed a value (e.g., using vector instructions) and call the corresponding application or function associated with the changed memory location. If an accessed memory value had not been modified (examples include memory read or memory write with the same value as currently stored in the memory at the specified address), without specification of a trigger address return, the application (or application scheduler) will not be able to directly determine the address accessed.

Note that a memory access can include cache modification such as cache eviction or flushing, change of ownership, snapshots, a discarding cache line.

In some examples, instead or in addition to changing a region of memory, a pointer to the memory can be passed to an application to be woken up. For example, monitoring hardware that identifies what memory location has been updated or accessed can also write a pointer to the memory location to a known register to both monitoring hardware and application. After wake-up, the associated application can access the pointer from the register and use the pointer to access other information stored in memory. For example, a translation lookaside buffer (TLB) (not shown) could convert addresses referenced by pointers to physical address space. The information referenced by the pointer can be any or a combination of data, a pointer, a packet, packet payload, packet header, command, executable code, library, and so forth.

In some embodiments, a trigger address is a memory pointer to a stack listing of trigger memory addresses. For example, if multiple addresses were updated nearly simultaneously or within a time frame of one another, then a memory pointer can identify a location in memory of the stack listing and the memory pointer can be written to a register. Monitoring application can identify the updated or accessed memory address or addresses using from the stack listing and read content of one or more memory addresses.

For example, a register to which a pointer or trigger address is written or accessed by a monitoring application can be a general central processing unit (CPU) register, such as EAX or ECX. CPU registers can be easier and faster to access by an application than a memory location. The register could be predefined so that certain information (e.g., pointer or trigger address) is stored in a particular register when monitoring application wakes up from MWAIT( ). Monitoring application (or a compiler of monitoring application, in some implementations) is configured to be aware of such definitions so that monitoring application reads a register at or after wake-up.

In other examples, the information can be placed in a memory region specified in MWAIT( ) command when application performs an MWAIT( ) command. Hardware logic (e.g., MONITOR/MWAIT) could prefetch content of the memory region into cache (last level cache (LLC), mid-level cache (MLC), level 1 (L1) cache, or other cache) to reduce information access time.

In some examples, active target functions can be configured to access related registers for outstanding wake up requests (e.g., using source code, compiler or library) without the need to go to sleep and be woken up.

A description of an example sequence of FIG. 3A using a monitoring application to wake up a target function is as follows. At Action 301, a source application or hardware device updates region M at offset X to wake up an application associated with offset X. Region M is among memory regions 1 to N. At Action 302, an update of region M triggers MONITOR/MWAIT hardware to detect a change in the memory region. At Action 303, MONITOR/MWAIT hardware copies region number of M and offset X into a register associated with a monitoring application. At Action 304, the monitoring application wakes up a target function associated with the updated region. A target function can be any processor-executed application or software, FPGA, hardware device, accelerator device, and so forth.

In some embodiments, monitoring application or the awoken target function can reset an address in the updated register to zero. In some embodiments, monitoring application or the target function can reset a register by moving a pointer to a next one in the stack of triggered addresses, while masking the monitoring hardware to prevent it from triggering a wake-up because of monitored memory region access.

Figure 3B:
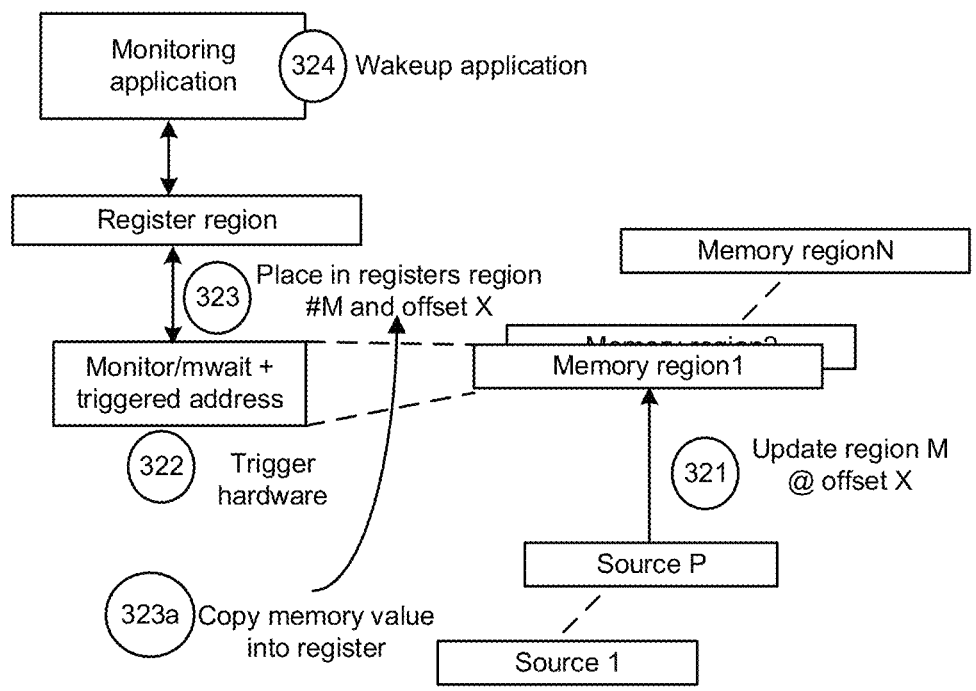
FIG. 3B shows an example manner of providing an indication of a reason for wake-up of an application.

FIG. 3B shows an example manner of providing an indication of a reason for wake-up of an application. A hardware monitoring system can trigger an application wake-up for any update to a defined memory region and provides extra information relating to a wake-up reason or related parameters to the target function directly. By contrast, not providing a wake-up cause could lead the awoken software or hardware to determine a wake-up cause. For example, various embodiments provide an exit reason and the address that triggered an MWAIT exit so that a variety of different wake-up causes are identified first by the hardware monitoring system and then the wake-up cause(s) are provided to the awoken target software or hardware.

In some embodiments, an updated value in a memory region associated with an application can identify a source that caused a memory update and wake-up. Without limiting possible use cases, values could also identify a reason for calling a target function (e.g., queue entry, interrupt, event, memory access, etc.), number of available jobs (e.g., packets in the queue), particular packet to process (e.g., packet number 9 out of packets 1-10), a maximum time given to the target function to run before it will be forced to give up the CPU (e.g., application can only run for T time so conclude a job within T time such as in a function as a service (FaaS)), or memory pointer for input parameters.

In some examples, there could be multiple sources triggering updates to a memory region and wake-up of an application or device. In some examples, a source updates its designated area in a memory region and multiple sources that updated the memory region can be identified to the awaken application. In some embodiments, just one source of wake-up can be identified whereby a source identifies itself in a memory region and overrides an earlier-in-time source identification made by another source. Updated contents of the memory can be written into a register or set of registers accessible to a target function. In addition to saving memory access time by the target function, providing information in a register could provide additional security, because the function does not actually access the memory and may not even know the memory address.

The following provides an example operation involving writing parameters or source of a wake up to a memory region. In Action 321, a source application or hardware device updates region M at offset X among memory regions 1 to N to wake up an application associated with offset X. In this example, a source P writes value P into a memory region among memory regions 1-N to request operation by a target function. In one example, in a case where a memory region represents a source and an offset within the region represents the target function, Source 1 writes into an offset X (function index) of memory region 1 among memory regions 1-N to request operation by a target function or device X. Similarly, Source 2 writes into an offset X (function index) of memory region 2 among memory regions 1-N to request operation by a target function, and so forth.

In yet another example, when a memory region is mapped into the target function and each source has its memory range within that memory region, Source 1-P writes a value into the corresponding location 1-P within memory region M mapped into the target function.

In yet another example, a number of sources is so large that mapping of every source into its memory region or its dedicated location within the memory region becomes impractical and Source 1-P writes a value into an offset X (function index) of the next available memory region without active wake-ups. In such scenario, the number of required regions is limited to a maximum number of unprocessed wake up instances, which could be significantly lower than total number of sources in the system.

In Action 322, an update of a memory region among 1 to N triggers MONITOR/MWAIT hardware, at action 323 and 323$a$, to copy the updated memory region in register associated with a target function the updated region (e.g., region M) at offset X.

At Action 324, a monitoring application wakes up a target function associated with the updated region. The target function can access the updated register to determine the source that requested the wake-up and job-related information. The value written to the register can identify a source and/or parameters that an application is to perform as well as job-related information. Job-related information can include one or more of: reason for calling a target function, one or more requesters of a wake-up, number of available jobs, particular job in a sequence of jobs to process, maximum time given to the application to run before it will be forced to give up the CPU, memory pointer for input parameters in memory, and so forth.

Figure 3C:
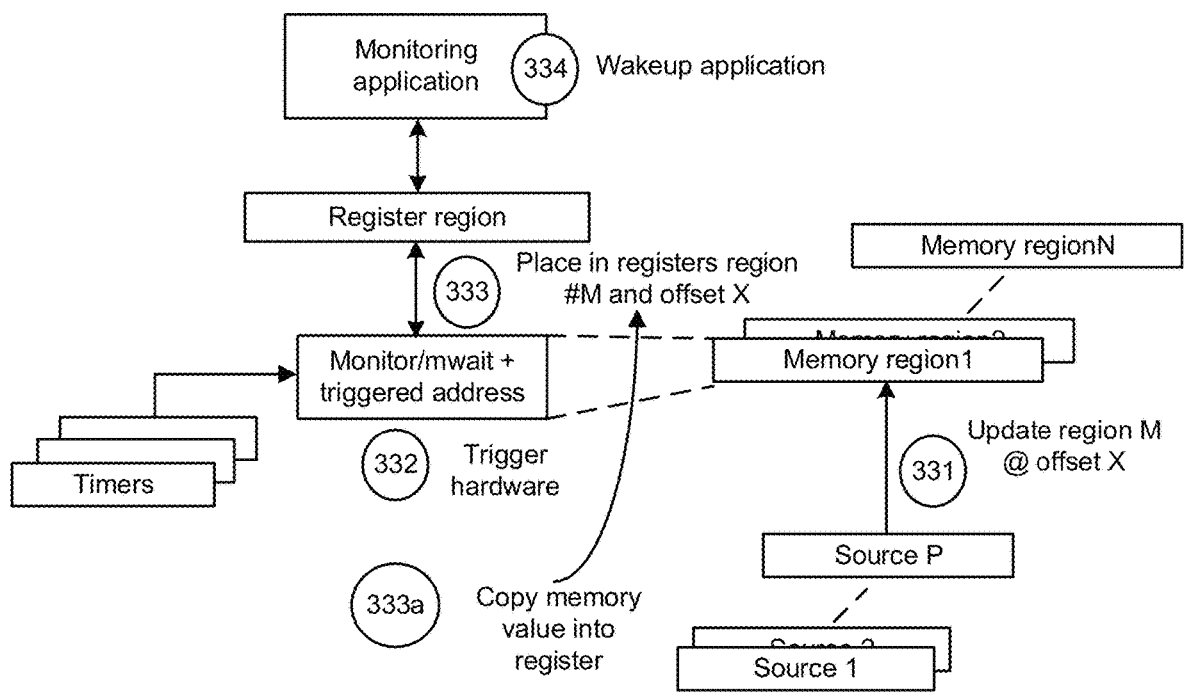
FIG. 3C shows an example of timer wake-up.

FIG. 3C shows an example of a timer-based wake-up of an application. Adding a timeout interrupt input to MONITOR/MWAIT device can enable enforcement of maximum application or device operation time and may be used for preemptive application or device scheduling. A timeout can be set by a monitoring application each time it is called by the application, function, or device with maximum runtime specified. An application, function, or device can release the shared resource, such as CPU, at a known state prior to timeout, such that context save is avoided and no previous state stored by the environment (for example, OS). In a scenario when a running application has been forcefully interrupted by a timeout, a monitoring application can cause saving of the application context and then application restore when the monitoring application decides to schedule the same interrupted application again. However, in a scenario when an application is run until completion and gives up its CPU resources before the timeout or finishes processing before the timeout, the application might not need its register context to restart (e.g., in microservices or FaaS environments), so the cost of context switching can be saved by eliminating registers save or restore operations. Giving up CPU resources could be implemented as returning from a function call from a monitoring application, which will bring control back to monitoring application.

In some embodiments, the monitoring application can implement a flexible batching scheme in which it just uses variable timeouts and discovers across them how much new event information has accumulated, to drive batched job execution without having to build precisely timed loops for accomplishing fine-grained control over batching intervals for latency sensitive dispatch.

In some embodiments, multiple memory regions are mapped to different sources. For example, memory region 1 can be allocated for Network Interface Card NIC1 sending a job to an application, memory region 2 could be used by Network Interface Card NIC2 to trigger use of the same application or a different application. In some embodiments, different memory regions could be allocated to different tenants. Assuming that the same application function can be utilized by multiple tenants (e.g., AT&T software is one tenant and Verizon software is another tenant), when an application wakes up, the application knows which tenant triggered the wake-up by access to a monitored memory region that allows correct setup of the required application context. This information can be utilized by the target application itself or by monitoring application.

At action 331, a source application or hardware device updates region M at offset X among memory regions 1 to N to wake up an application associated with offset X. At Action 332, an update of a memory region among 1 to N triggers MONITOR/MWAIT hardware, at action 333 and 333a, to copy the reference to the accessed memory region M and/or offset X in register(s) associated with a target function. For example, MONITOR/MWAIT hardware can receive timer signals and a source provides an exit reason in a memory region and identifies a timer signal index in a memory region. As another example, a timer can act as a wake-up source that can update memory region to wake up an application or function. At Action 334, a monitoring application wakes up a target function associated with the updated region and/or offset.

Figure 4:
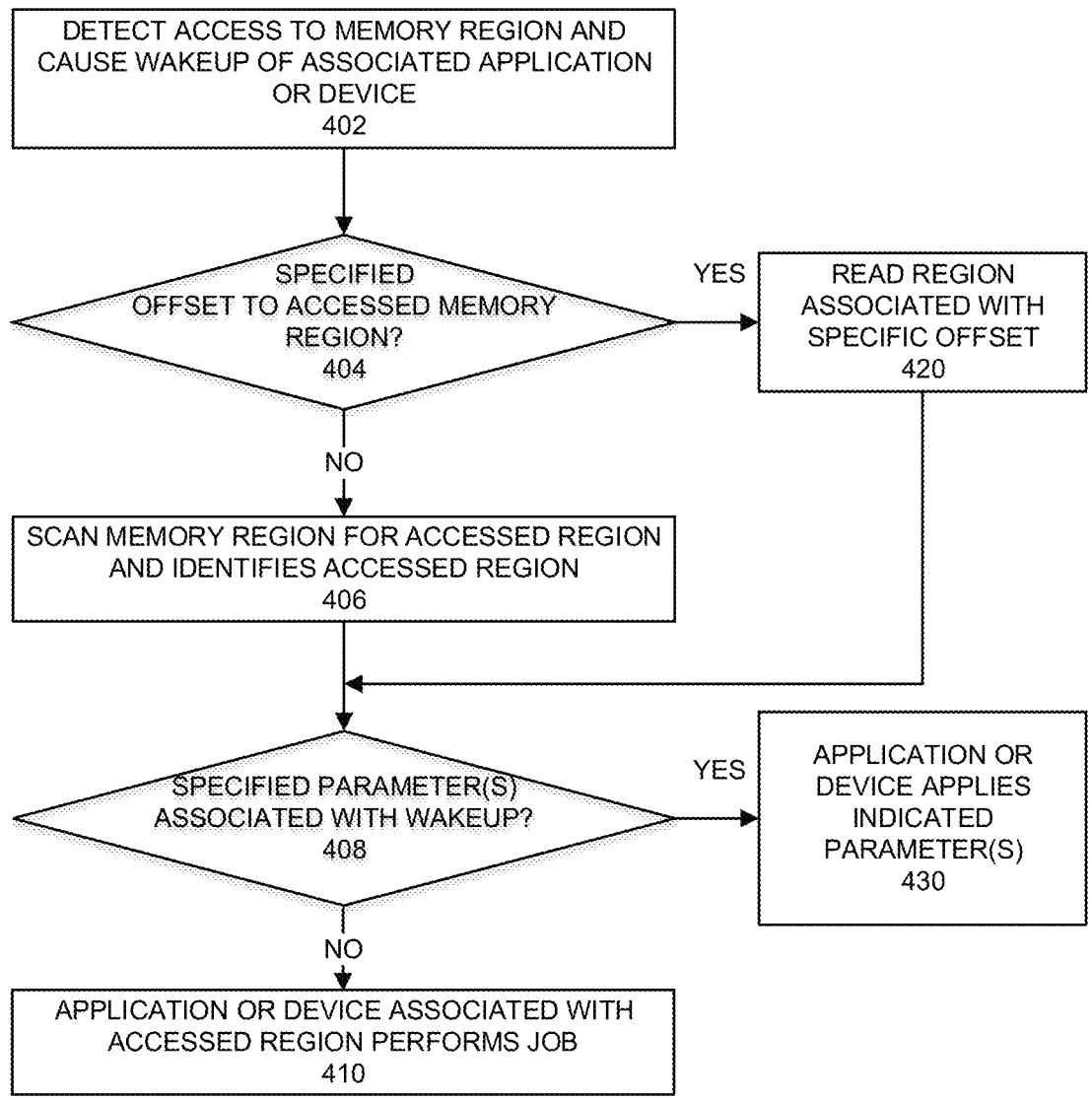
FIG. 4 depicts an example process.

FIG. 4 depicts an example process. At 402, the process can detect an access to a memory region and cause wake up of an associated application or device. The access can be any of a write or read by a source application or device. The memory region can be associated with one or more applications or processes executed by a CPU that can be awaken by a hardware monitor device from writing to or reading from the memory region. In some examples, the memory region can be associated with one or more hardware devices that can be awaken by a hardware monitor device from writing to or reading from the memory region. The hardware monitor device can be a MONITOR/MWAIT device that detects updates called from kernel or user space. In some examples, access to a memory region causes MONITOR/MWAIT device to wake up a monitoring application and the monitoring application can cause the application or device associated with the accessed memory region to wake up.

At 404, a determination is made as to whether a specific offset into the memory region of the access is provided. If the specific offset is provided, then the process continues to 420. If the specific offset is not provided, the process continues to 406.

At 420, the awoken function reads a region of memory starting at the specific offset into the memory region. The specific offset can be copied to a register by a monitoring hardware (e.g., MONITOR/MWAIT) and read by the awoken application. The region of memory starting at the specific offset into the memory region can be a specific size configured to be read by the application. The process continues to 408.

At 406, the awoken function scans the memory region for an accessed region of memory and identifies the accessed region of memory. The process continues to 408.

At 408, the awoken function determines whether there are specified parameters associated with a job or actions requested to be performed by the awoken function. An awoken function (e.g., in its source code, a compiler, or library) can be configured to identify one or more specified parameters. Specified parameters can include one or more of: a reason for calling a target function (e.g., queue entry, interrupt, number of available jobs (e.g., packets in the queue), particular packet to process (e.g., packet number X out of packets 1-10), a maximum time given to the target function to run before it will be forced to give up the CPU (e.g., application can only run for T time so conclude a job within T time), or memory pointer for input parameters in memory. If the process determines there are no specific parameters associated with a job or actions to be performed by the awoken function, the process continues to 410. If the process determines there are specific parameters associated with a job or actions to be performed by the awoken function, the process continues to 430.

At 410, the awoken function associated with the accessed memory region performs a job associated with the accessed memory region. To perform a job, the awoken function may check its incoming job queues, perform some background maintenance (e.g., memory cleaning), re-arrange priorities or polling devices.

At 430, the awoken function associated with the accessed memory region performs a job associated with the accessed memory region based on the parameters specified in the memory region. In some embodiments, the parameters can be copied from the accessed memory region to a register accessible by the application or device. Various examples of parameters are described herein.

Various embodiments provide a system that can prioritize which function can access a memory region. The memory region can be presented as a queue (e.g., first in first out (FIFO)) that can store multiple entries. When a function wakes up, multiple entries (e.g., jobs) can be present in a queue for performing. Prioritization of performance of entries can be provided in a variety of ways. A function can have multiple associated memory regions and each memory region is assigned a priority level. For example, if a function has 5 associated memory regions, region 1 is highest priority, region 2 is next highest priority and so forth. The awoken function reads from memory region according to priority order. In some embodiments, a monitoring hardware can prioritize what function reads from and the function requests a next event from the monitoring hardware. A received event can have an associated priority level so that the event is placed in the appropriate priority level memory region.

Various embodiments provide a self-perpetuated queuing event through meta-queues. A "stored behavior" may be programmed through a monitoring primitive so that a notification causes a stored behavior and the stored behavior may under various conditions enqueue a second event. The enqueuing of a second event can be a submission into a meta-queue. Meta-queues may be monitored just as normal queues are monitored but meta-queues are written to by the monitoring hardware, indirectly through the monitoring of actions queued due to software actions. Accordingly, multiplexing and demultiplexing can be provided in calling and triggering load balancing.

Figure 5:
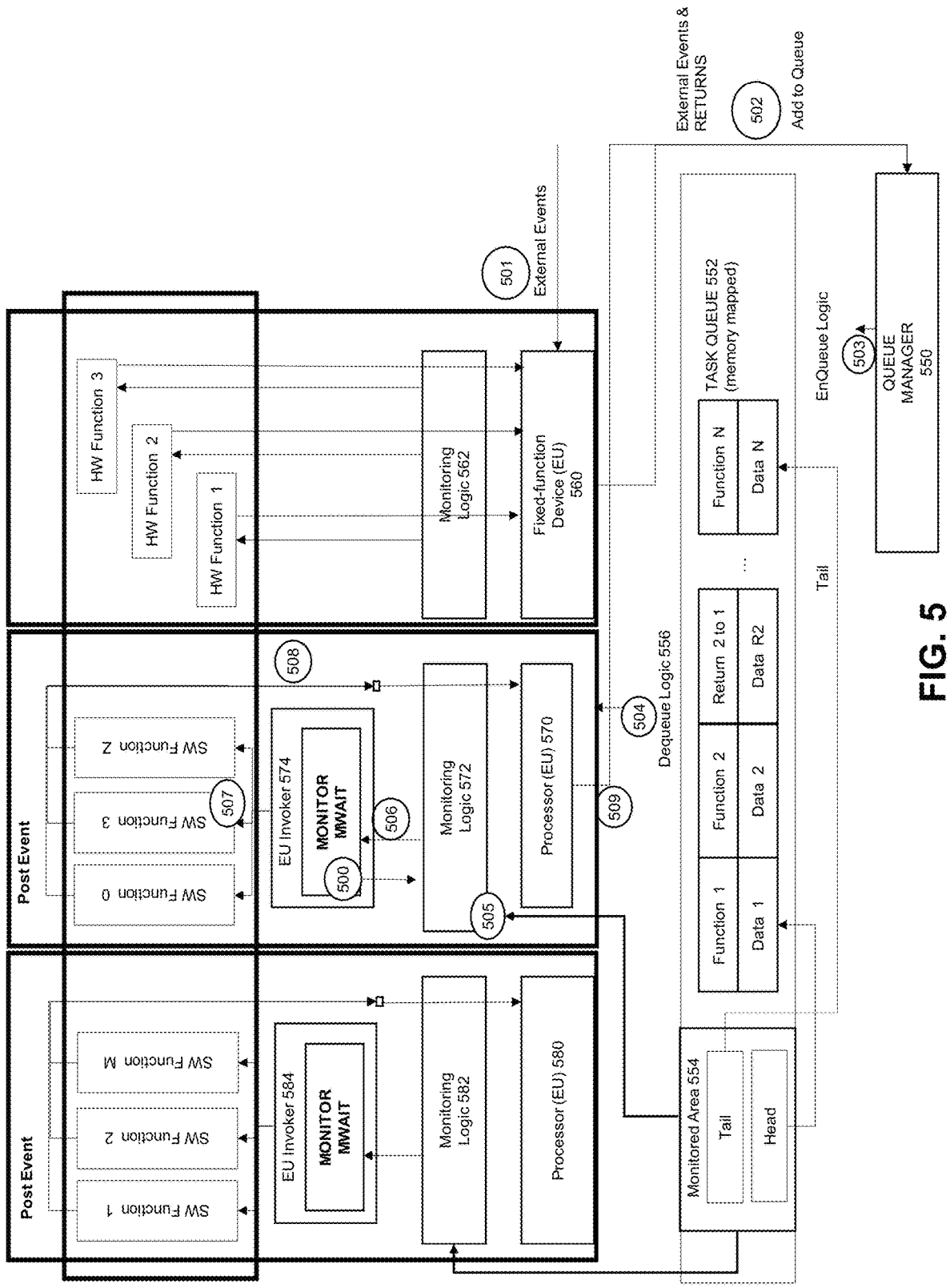
FIG. 5 depicts an example system.

FIG. 5 depicts an example system. An example of operation of the system is described. At 500, a MONITOR/MWAIT device or other memory access monitoring device or software can be programmed to monitor access to a monitored area 554 for invoking functions 0, 3, and Z. For example, monitored area 554 (in memory) can store a header and/or tail references to events in task queue 552. At 501, an external event can be received at the system. For example, a device can receive an external event (e.g., update of monitored memory region, packet received at network interface, clock timeout signal) from one or more sources (e.g., applications, fixed function devices (data movers, accelerators, clock timeout signal) and so forth).

At 502, a call to an event handler is posted to queue manager 550. A queue manager can also include a function scheduler or the queue manager can be part of a function scheduler. The device that receives the external event puts the event into queue manager 550. At 503, queue manager 550 enqueues the event into queue 552. A priority of the event can be set based on a position in the queue. Separate event queues can be allocated for each function. Multiple priority queues can be allocated for a function whereby a queue is associated with a particular priority level (e.g. high, medium, low). In some examples, a received event in queue 552 is one or more bytes in length, although other sizes can be used. Queue manager 550 can manage a performance order of events and data storage and availability.

At 504, dequeue logic 556 determines an Execution Unit (EU) 570 for the event. If EU 570 is available, dequeue logic 556 provides an available event to available EU 570. EU 570 can process the available event by updating a memory region associated with a target function for the event by accessing a corresponding entry at tail or head locations in monitored area 554 to identify an event to process. In some cases, only a tail is updated by queue manager 550 with new enqueued event information and a head location is used by EU 570 to dequeue and process the next event. But some urgent events that cannot wait for other events in the same queue to be processed can be enqueued by queue manager 550 directly into the head or other location. Events can be processed in order received or according to priority and multiple events can be targeted to a hardware or software function. In some cases, queue manager 550 and EU 570 can run independently working on different queue entries, hence queue accesses are lockless. However, in some cases, when queue manager 550 enqueues into a non-tail location, there could be a need for tighter synchronization between these entities.

At 505 and 506, monitoring logic 572 detects changes to memory region (e.g., head or tail) and causes exit from a MWAIT. At 507, MWAIT exits and wakes a software (SW) function 3 and SW function 3 accesses information in monitored area 554 specified by head location. At 507, SW function 3 processes data associated with its event, which could be either included into the dequeued event entry, referred by the information in the event entry (e.g. index or pointer to the data), or delivered by the event source into the well-known location agreed upon between event source and target function. At 508, SW function 3 informs EU 570 that the event is completed. At 509, EU 570 indicates completion of processing in a signal to queue manager.

Queue manager 550 can be configured to use a table that indicates a next processing step based on a source of an external event (e.g., service chaining). In this example, completion of processing an event results in an event being posted to task queue 552 to call another function or results in copying data to a location for access by the source of the external event. Thereafter, other enqueued events are processed.

Figure 6:
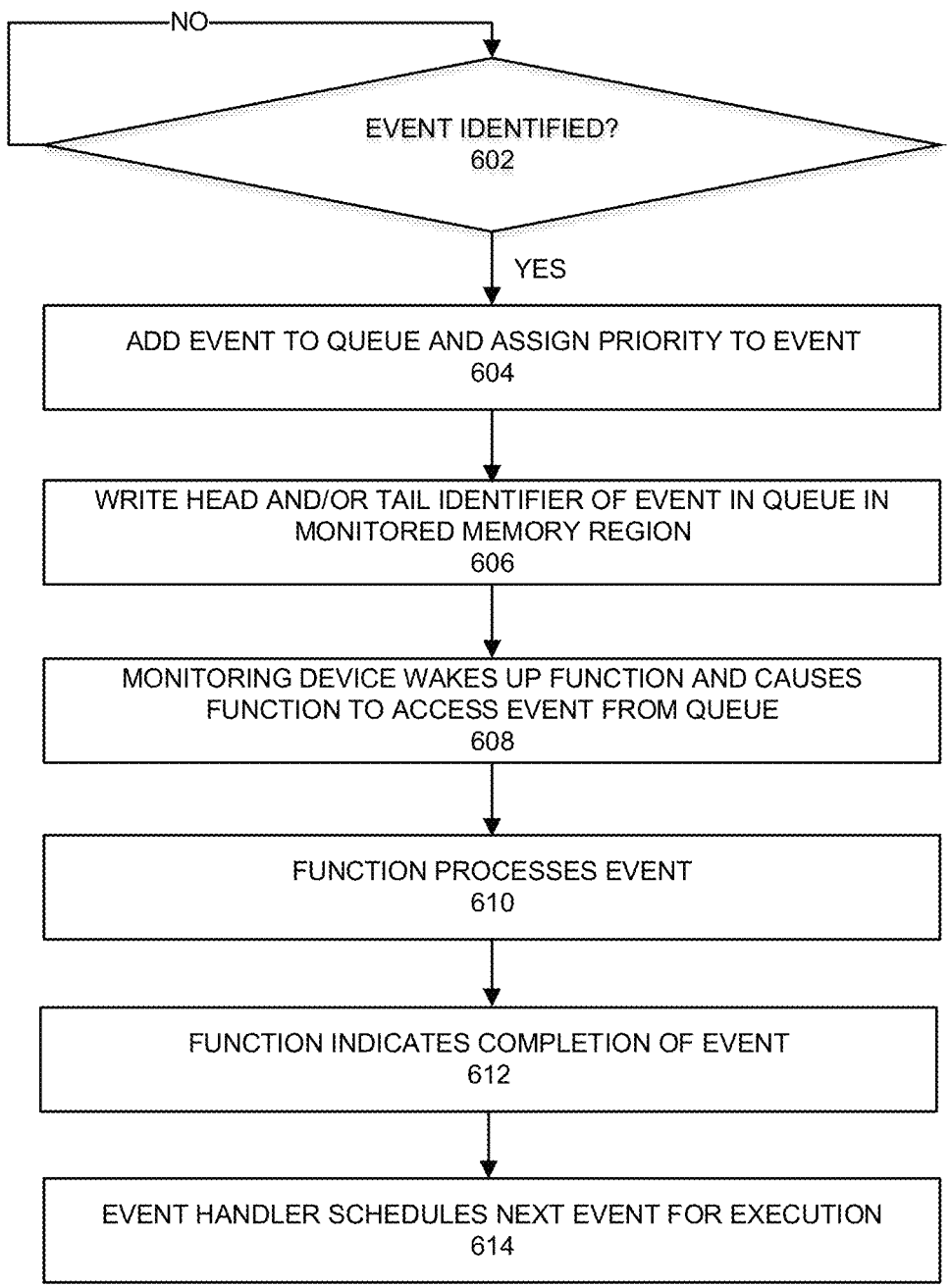
FIG. 6 depicts an example process.

FIG. 6 depicts an example process that can be applied by a system to queue events for execution by one or more functions. A non-limiting example is the system described with respect to FIG. 5 can apply the process of FIG. 6. At 602, a determination is made as to whether a new event is received. If a new event is not received, 602 repeats. If a new event is received, the process continues to 604. At 604, the event is added to a queue. In addition, a priority can be assigned to the event. A priority level can be based, for example, on a source of the event or identification of a priority level within the event by a source of the event. At 606, a head and/or tail pointer to the event is written to a monitored memory region, which could be at the head, tail or other location determined by an enqueuing entity based on event priority or queue type. A queue can be defined as a strict first-in-first-out (FIFO) queue with event enqueued only at the tail and dequeued only from the head, or prioritized queue with higher flexibility of enqueue location at the head, tail or other location.

At 608, a monitoring device wakes up a target function and causes the function to access the event from the queue. For example, the monitoring device can be a MONITOR/MWAIT device that monitors accesses to a memory region that stores head or tail pointers. The function can be any processor-executed software and/or a hardware device. At 610, the target function performs processing associated with the event. At 612, the target function indicates to an event handler that processing the event is completed. At 614, the event handler schedules a next event for processing by a target function.

Various embodiments provide for queues of events on a per-function, priority level, and so forth. Various embodiments provide for one or more of: monitoring of a meta-queue, monitoring multiple queues, providing explicit reasons for MWAIT exits, providing hardware event filtering over MONITOR (for exit reasons, memory ranges), notification of excessive time in MWAIT, providing indications to a different core, providing forced exit(s) from MWAIT when control software discovers a reason, and the monitoring hardware acting as a state engine to produce additional meta-events of its own as specified in its programming).

Various embodiments provide for filtering what events trigger a function wake-up. Event filters could be a bit-mask setting which event types would be ignored such as certain interrupts, System Management Interrupts (SMIs), non-maskable interrupts (NMIs), or other non-memory access events. For example, an event can trigger function wake-up when a non-volatile memory (NVM) cache line is evicted out of caches (or from a cache line write back (CLWB)) to reduce triggering on partially completed updates. Wake-ups can be filtered so an event may not trigger application wake-ups when interrupts or SMIs take place. System defined policy or interrupt controller (e.g., Advanced Programmable Interrupt Controller or its functional equivalent) may redirect interrupts to other cores or devices.

Monitoring hardware can unify both memory-based and interrupt/event based notifications. For example, when a wait time is excessive, a forced termination out of MWAIT can occur to allow software to retake control.

Figure 7:
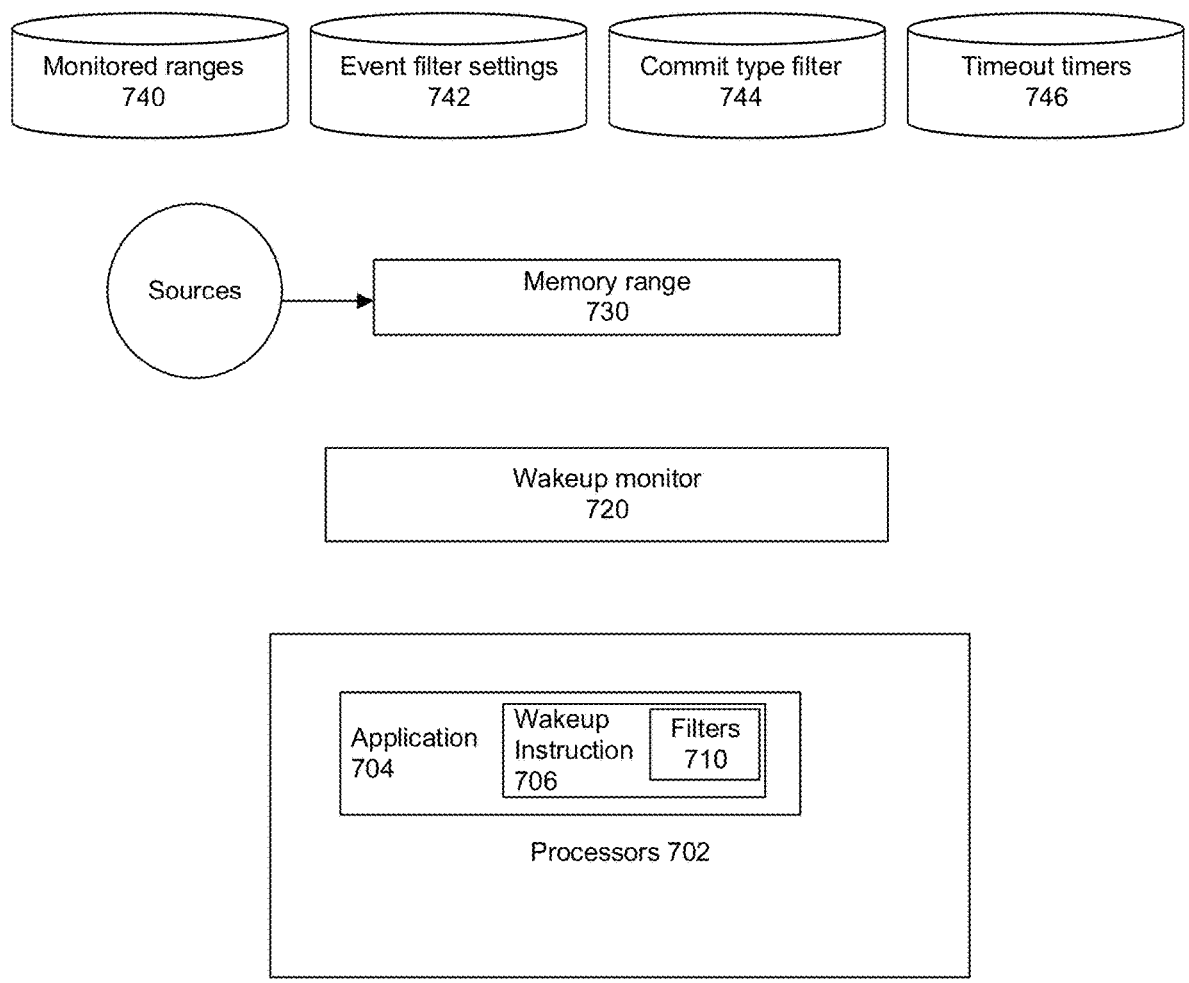
FIG. 7 depicts an example system that can monitor one or more specified memory ranges and observe filters to are not permitted to wake up an application.

FIG. 7 depicts an example system that can monitor one or more memory regions 730 and observe filters such that accesses to the one or more memory regions 730 are permitted or not permitted to wake up application 704 according to an applied filter rule. Processor 702 can execute application 704 and application 704 can include an instruction 706 that can specify whether any filter is available to apply to allow or disallow wake ups in certain situations. Filters 710 provided by instruction 706 can be added in source code, compiler, library, whether during runtime or prior to runtime.

In some examples, filters 710 can be stored to any CPU register. A CPU may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. For example, an RCX or RDX register can be used to store applied filters. For example, a filter can be a commit type that describes whether the requestor wants to be woken up (or not) on various state transitions on the data cache line such as but not limited to: (a) write to certain monitored memory range(s); (b) non-destructive write (write that does not change the value (same value written again)); (c) write coming through an input output coherence (e.g., writes that come in due to input/output direct memory access (DMA)); (d) reads from monitored memory range, or (e) a non-data operation like Cache Line Write Back (CLWB) when the data is written to memory but a cache line is not flushed.

In some examples, filter 710 can indicate to not cause wake up from certain sources. A filter can be set to ignore events from various sources. Sources can be any of or more than: a timer, core, network interface controller, direct memory access (DMA) device, accelerator, fixed function device, FPGA, and so forth.

Operational parameters of wake-up monitor 720 can be stored. An address range of one or more contiguous or non-contiguous address ranges 740 in memory 730 can be identified for monitoring by a wake-up monitor 720. For example, wake-up monitor 720 can be a MONITOR/MWAIT hardware device that can monitor one or more contiguous or non-contiguous address ranges 740. Wake-up monitor 720 can apply filters for event filter settings 742 or commit type filter settings 744. Wake-up monitor 720 can apply settings in timeout timers 746 to trigger a wake-up event.

Wake-up monitor 720 can wake a function at least because one or more memory regions is accessed (e.g., read), updated, a timeout has occurred, or because of a special interrupt. To program wake-up monitor 720, instruction MONITOR [RAX=addr, RCX/RDX=hints] can be used and added to an application in source code by a developer, added by a compiler or included in a library, among others. Parameter RAX can identify one or more address ranges to be monitored. Parameter RCX/RDX can identify that an RCX or RDX register includes filters or hints of memory access type that do not cause wake up or cause wake-up. Other types of registers can be specified or used.

In some embodiments, monitoring logic can monitor multiple queues by maintaining a meta-queue, where queue manager posts which of the multiple queues has data to avoid accessing an empty queue. Monitoring logic can monitor meta-queue, dequeue the entry which contains reference to actual queue with data, and then dequeues the entry from actual queue.

To define monitoring of multiple queues several methods can be employed. MONITOR instructions can be executed multiple times to set up monitoring of multiple addresses. Alternatively, or in addition, a table with multiple address ranges to monitor can be configured and a MONITOR instruction can include a "hint" in a register to inform a monitoring hardware that of a table with multiple address ranges to monitor. The table can include the following information (length could be specified explicitly or derived implicitly based on default length definition):

[start address 1] [length 1] . . .
[start address N] [length N]

Figures 1, 8A:
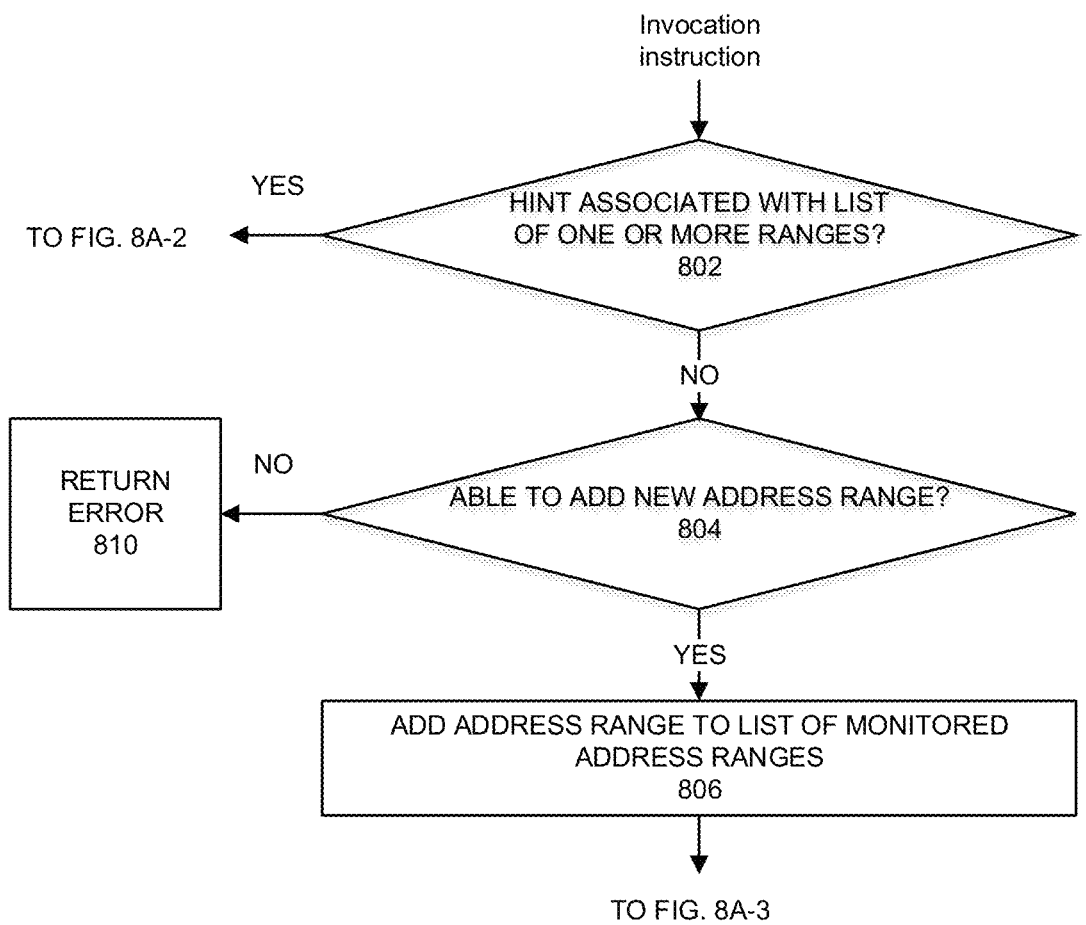
Figures 2, 8A:
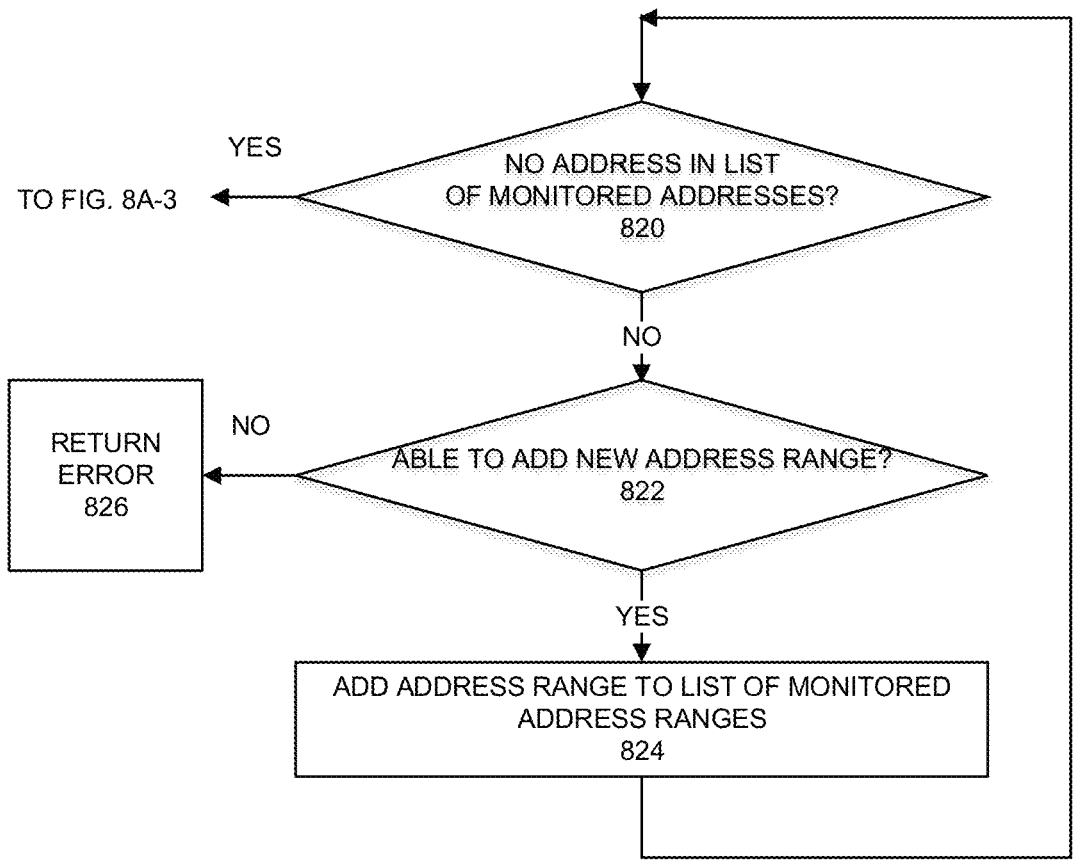
Figures 3, 8A:
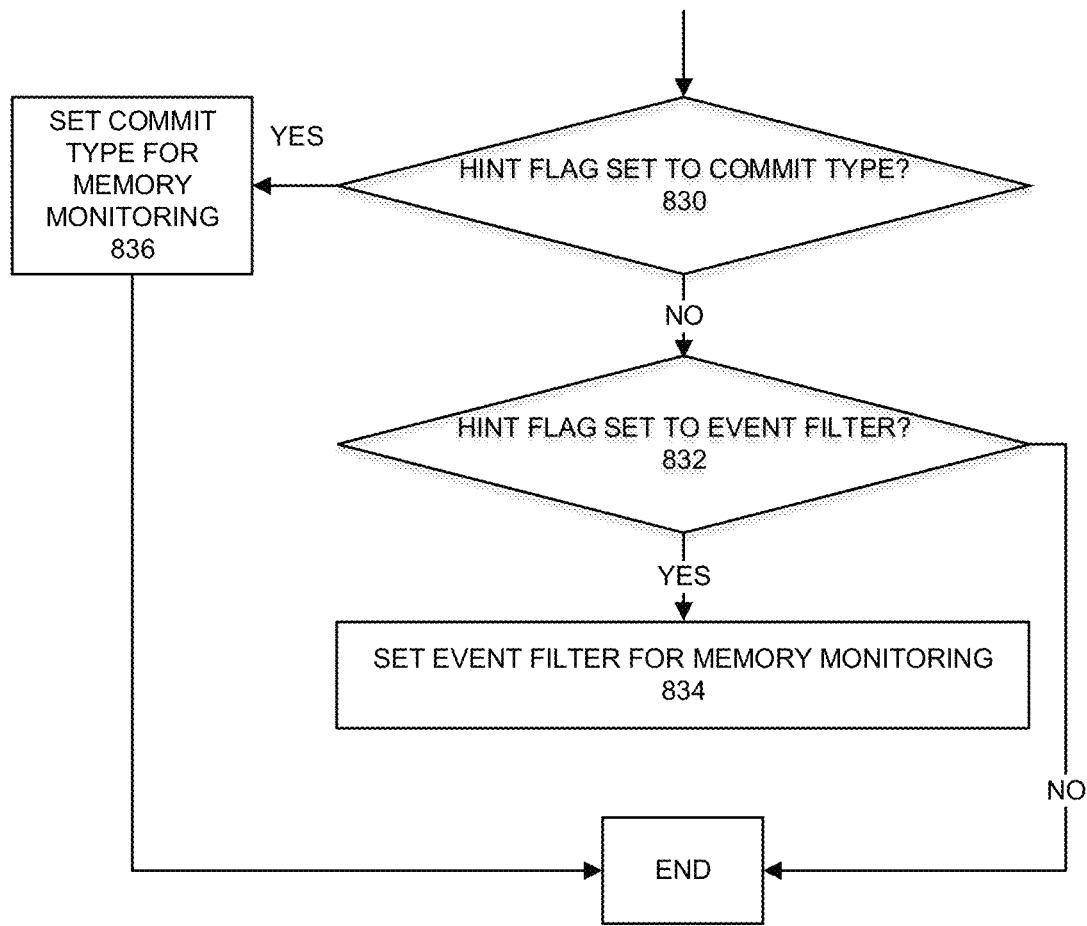

FIGS. 8A-1 to 8A-3 depict an example process to specify multiple address ranges to monitor. At 802, a determination is made as to whether a hint is provided with an instruction and the hint is associated with a list of one or more ranges. If a hint is provided with an instruction and the hint is associated with a list of one or more ranges, then the process proceeds to FIG. 8A-2. If a hint is not provided with an instruction or the hint is not associated with a list of one or more ranges, the process proceeds to 804.

At 804, a determination is made as to whether the list of one or more address ranges can be added for monitoring. If the list of one or more ranges can be added, then the process continues to 806. If the list of one or more ranges cannot be added, then the process continues to 810 and returns and error.

At 806, the list of one or more ranges is added to monitored address ranges. The process continues to the process shown in FIG. 8A-3.

FIG. 8A-2 depicts a process that can be used for identifying monitored memory regions. At 820, a determination is made as to whether a list of monitored addresses is empty. If the list of monitored addresses is not empty, then the process continues to 822. If the list of monitored addresses is empty, the process continues to the process of FIG. 8A-3.

At 822, a determination is made as to whether an address range can be added to a list of monitored addresses. For example, the specified address could already be monitored by another target function, which would trigger an error. A list of monitored addresses can have a maximum number of monitored addresses and if the maximum number is exceeded by an attempted addition of an address range, then the address range cannot be added to a list of monitored addresses. For example, if a monitored address range that is attempted to be added can be outside of a permitted monitored address range, then the address range cannot be added to a list of monitored addresses. If an address range cannot be added to a list of monitored address ranges, the process continues to 826 to indicate an error. If an address range can be added to a list of monitored address ranges, the process continues to 824.

At 824, the address range specified in the instruction is added to a list of monitored address ranges. The MONITOR hardware is configured to monitor the addresses in the list of monitored addresses.

FIG. 8A-3 depicts a process that can be used to determine how to apply a hint. In some embodiments, hints or filters apply to all addresses successfully added to a list. At 830, a determination is made whether a hint flag indicates a hint is a commit type. For example, a hint provided with an instruction can include a flag that indicates whether a hint is a commit or event filter. A commit or access type hint can indicate that the function is to be woken up on various state transitions on the data cache line or memory region. If a hint flag indicates a hint is a commit type, the process continues to 836. If the hint flag indicates not a hint type, the process continues to 832.

At 832, determination is made whether a hint flag indicates a hint is an event type. An event filter can be associated with a source of wake-up (e.g., timer, core, network interface, DMA engine, accelerator, and so forth). If the hint flag indicates a hint is an event type, the process continues to 834. If the hint flag indicates a hint is not an event type, the process can end or perform other actions. In some examples, either commit or event type filters are supported.

At 834, applicable event type filters are applied for use. For example, a monitoring hardware device or application is configured to apply any applicable commit type hint to determine whether to wake a function. The process can end or perform other actions.

At 836, a commit type hint is configured for memory monitoring. For example, a monitoring hardware device or application is configured to apply any applicable commit type hint to determine whether to wake a function. After 836, the process can end or perform other actions.

Various embodiments extend MWAIT operation with reporting of exit reason and a triggering address and timing out application operation. To access exit reason, triggering address, timing out information, or other information, a hint is provided for use by MWAIT. According to some embodiments, MWAIT can be configured to define a timeout (e.g., specified in clock ticks or milliseconds). For example, upon reaching a timeout, MWAIT will set an exit reason to time out to allow software handling. Application behavior can be governed by an operating system (OS) or infrastructure scheduler or orchestrator which may limit an amount of time a function can be in waiting or active state. An OS or infrastructure can set a timeout in a CPU register which will cause an exception when counted clock ticks reach a specified value. In some embodiments, an OS or infrastructure may send an inter-process interrupt (WI) which will cause unconditional control transfer to OS-defined interrupt service routine, which can make a decision wherever to terminate or to continue execution of a function.

Figure 8B:
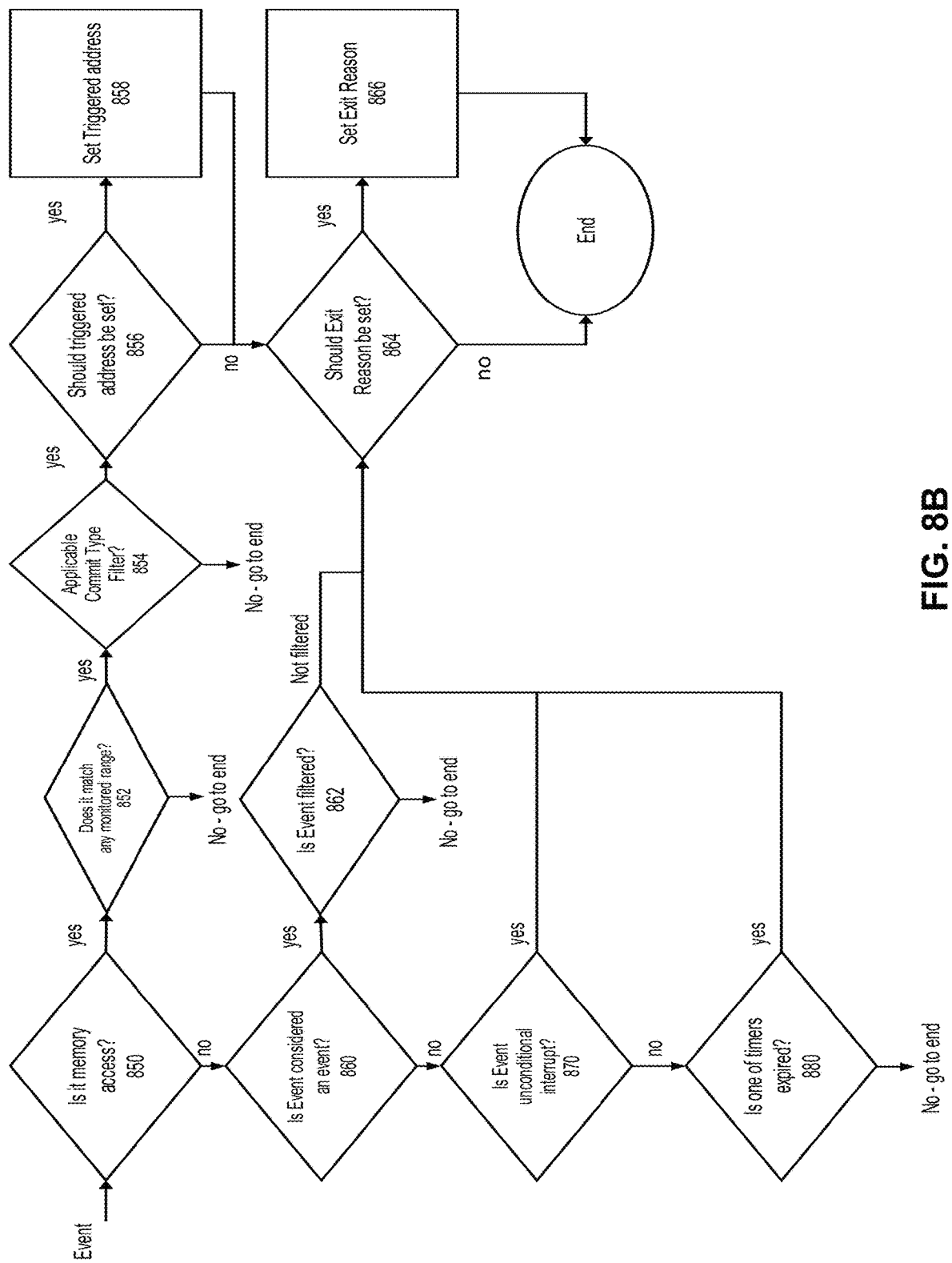
FIG. 8B depicts memory monitoring operations.

FIG. 8B depicts a process that can be used for a memory monitoring operation. Since memory monitoring has a limitation on number of monitored ranges, CPUID instruction may report exact capabilities, including amount of concurrently monitored ranges per core, event filtering and commit type capabilities. The process can be used by a MWAIT device or processor-executed application that monitors for accesses to a memory region and determines what function to wake based on commit filters, event filters, or timers. At 850, a determination is made whether a received event is a memory access. If the event includes a memory access, the process continues to 852. At 852, a determination is made as to whether the memory access corresponds to a monitored memory region. If the memory access corresponds to a monitored memory region, the process continues to 854. If the memory access does not correspond to a monitored memory region, the process can end or perform other actions.

At 854, the process determines whether a commit type filter is matched. If a commit type filter is applicable, the process continues to 856. If a commit type filter is not applicable, the process can end or perform other actions.

At 856, the process determines if a triggered address should be set. A triggered address can be specified in the accessed memory region, for example. If a triggered address is available, the process continues to 858. If a triggered address is not available, the process continues to 864.

At 858, a triggered address is set. For example, the triggered address can indicate a source that requests a wake-up of a function. Setting a triggered address can include writing the triggered address to a register that is accessible by an awoken function to inform the awoken function what source triggered its awakening. The process continues to 864.

At 860, a determination is made as to whether a detected event is considered an event that does not involve memory address trigger. If the detected event is considered as such, the process continues to 862. At 862, a determination is made as to whether the event is filtered. If the event is filtered, the process ends or performs other actions. If the event is not filtered, the process continues to 864.

At 864, a determination is made as to whether an exit reason is to be set. If an exit reason is provided with the received event, the process continues to 866. If an exit reason is not provided with the received event, the process can end or perform other actions. For example, as mentioned earlier, an exit reason can indicate a reason for calling a target function (e.g., queue entry, interrupt, timeout, etc.), number of available jobs (e.g., packets in the queue), particular packet to process (e.g., packet number 9 out of packets 1-10), a maximum time given to the target function to run before it will be forced to give up the CPU (e.g., application can only run for T time so conclude a job within T time such as in a function as a service (FaaS)), or memory pointer for input parameters.

At 866, the exit reason can be set. Setting an exit reason can include writing the exit reason to a register that is accessible by an awaken function. After 866, the process can end or perform other actions.

At 870, a determination is made as to whether the received event is an unconditional interrupt. For example, an unconditional interrupt can be a non-maskable interrupt (NMI). If the received event is an unconditional interrupt, the process continues to 864. If the received event is not an unconditional interrupt, the process continues to 880.

At 880, a determination is made as to whether the received event is related to a timer expiration. For example, a clock counter can issue an event at expiration of a timer or a timer reaching a particular value. If the received event is related to a timer expiration, the process continues to 864. If the received event is not related to a timer expiration, the process can end.

Figure 9:
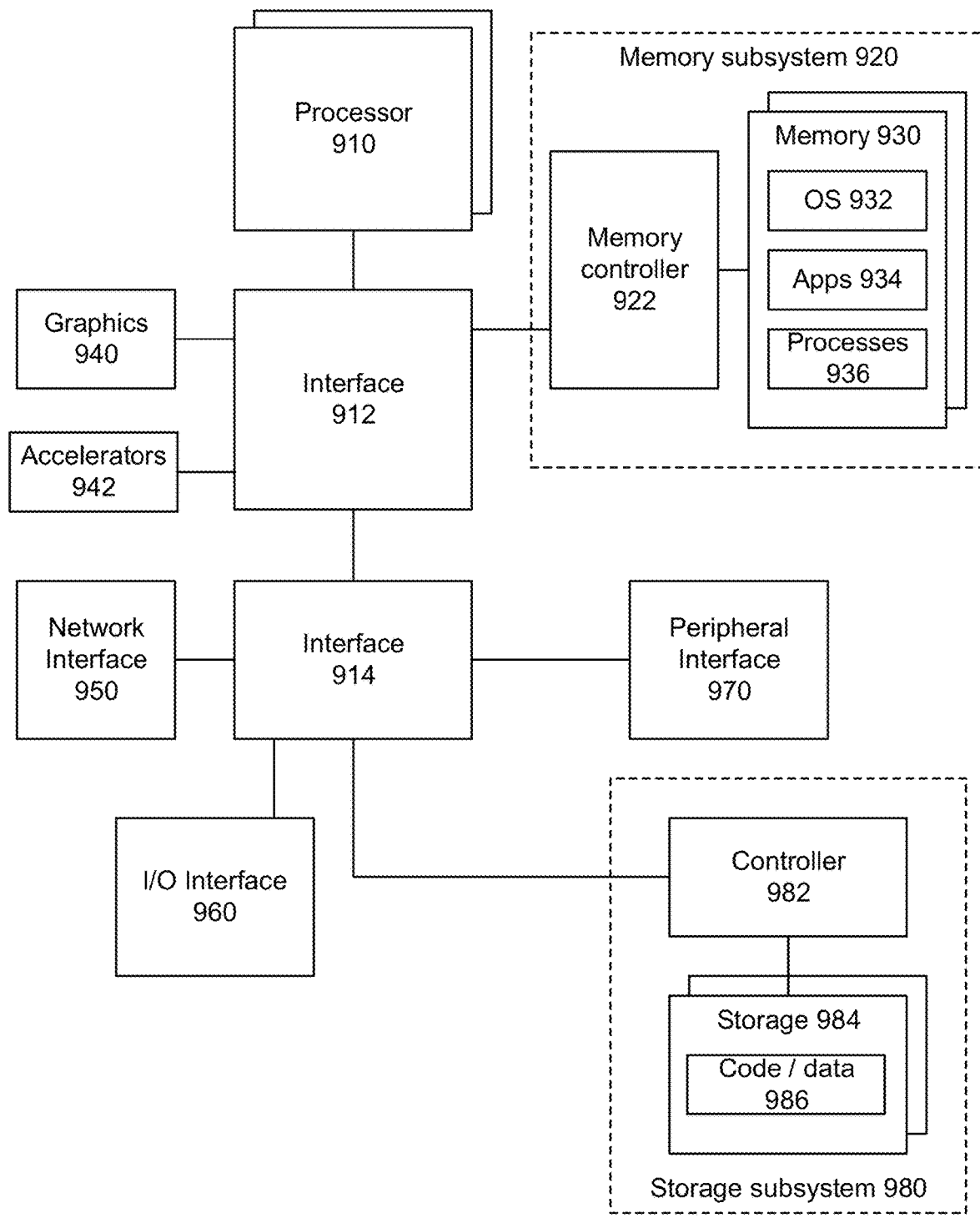
FIG. 9 depicts a system.

FIG. 9 depicts a system. The system can use embodiments described herein in any component (e.g., processor 910, graphics 940, accelerators 942, network interface 950, memory 930, or storage 984). System 900 includes processor 910, which provides processing, operation management, and execution of instructions for system 900. Processor 910 can include any type of microprocessor, central processing unit (CPU), graphics processing unit (GPU), processing core, or other processing hardware to provide processing for system 900, or a combination of processors. Processor 910 controls the overall operation of system 900, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 900 includes interface 912 coupled to processor 910, which can represent a higher speed interface or a high throughput interface for system components that needs higher bandwidth connections, such as memory subsystem 920 or graphics interface components 940, or accelerators 942. Interface 912 represents an interface circuit, which can be a standalone component or integrated onto a processor die. Where present, graphics interface 940 interfaces to graphics components for providing a visual display to a user of system 900. In one example, graphics interface 940 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 940 generates a display based on data stored in memory 930 or based on operations executed by processor 910 or both. In one example, graphics interface 940 generates a display based on data stored in memory 930 or based on operations executed by processor 910 or both.

Accelerators 942 can be a fixed function offload engine that can be accessed or used by a processor 910. For example, an accelerator among accelerators 942 can provide compression (DC) capability, cryptography services such as public key encryption (PKE), cipher, hash/authentication capabilities, decryption, or other capabilities or services. In some embodiments, in addition or alternatively, an accelerator among accelerators 942 provides field select controller capabilities as described herein. In some cases, accelerators 942 can be integrated into a CPU or connected to CPU by various devices (e.g., a connector to a motherboard or circuit board that includes a CPU and provides an electrical interface with the CPU). For example, accelerators 942 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 942 can provide multiple neural networks, CPUs, processor cores, general purpose graphics processing units, or graphics processing units can be made available for use by artificial intelligence (AI) or machine learning (ML) models. For example, the AI model can use or include any or a combination of a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 920 represents the main memory of system 900 and provides storage for code to be executed by processor 910, or data values to be used in executing a routine. Memory subsystem 920 can include one or more memory devices 930 such as read-only memory (ROM), flash memory, one or more varieties of random access memory (RAM) such as DRAM, or other memory devices, or a combination of such devices. Memory 930 stores and hosts, among other things, operating system (OS) 932 to provide a software platform for execution of instructions in system 900. Additionally, applications 934 can execute on the software platform of OS 932 from memory 930. Applications 934 represent programs that have their own operational logic to perform execution of one or more functions. Processes 936 represent agents or routines that provide auxiliary functions to OS 932 or one or more applications 934 or a combination. OS 932, applications 934, and processes 936 provide software logic to provide functions for system 900. In one example, memory subsystem 920 includes memory controller 922, which is a memory controller to generate and issue commands to memory 930. It will be understood that memory controller 922 could be a physical part of processor 910 or a physical part of interface 912. For example, memory controller 922 can be an integrated memory controller, integrated onto a circuit with processor 910.

While not specifically illustrated, it will be understood that system 900 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 900 includes interface 914, which can be coupled to interface 912. In one example, interface 914 represents an interface circuit, which can include standalone components and integrated circuitry. In one example, multiple user interface components or peripheral components, or both, couple to interface 914. Network interface 950 provides system 900 the ability to communicate with remote devices (e.g., servers or other computing devices) over one or more networks. Network interface 950 can include an Ethernet adapter, wireless interconnection components, cellular network interconnection components, USB (universal serial bus), or other wired or wireless standards-based or proprietary interfaces. Network interface 950 can transmit data to a device that is in the same data center or rack or a remote device, which can include sending data stored in memory. Network interface 950 can receive data from a remote device, which can include storing received data into memory. Various embodiments can be used in connection with network interface 950, processor 910, and memory subsystem 920.

In one example, system 900 includes one or more input/output (I/O) interface(s) 960. I/O interface 960 can include one or more interface components through which a user interacts with system 900 (e.g., audio, alphanumeric, tactile/touch, or other interfacing). Peripheral interface 970 can include any hardware interface not specifically mentioned above. Peripherals refer generally to devices that connect dependently to system 900. A dependent connection is one where system 900 provides the software platform or hardware platform or both on which operation executes, and with which a user interacts.

In one example, system 900 includes storage subsystem 980 to store data in a nonvolatile manner. In one example, in certain system implementations, at least certain components of storage 980 can overlap with components of memory subsystem 920. Storage subsystem 980 includes storage device(s) 984, which can be or include any conventional medium for storing large amounts of data in a non-volatile manner, such as one or more magnetic, solid state, or optical based disks, or a combination. Storage 984 holds code or instructions and data 986 in a persistent state (i.e., the value is retained despite interruption of power to system 900). Storage 984 can be generically considered to be a "memory," although memory 930 is typically the executing or operating memory to provide instructions to processor 910. Whereas storage 984 is nonvolatile, memory 930 can include volatile memory (i.e., the value or state of the data is indeterminate if power is interrupted to system 900). In one example, storage subsystem 980 includes controller 982 to interface with storage 984. In one example controller 982 is a physical part of interface 914 or processor 910 or can include circuits or logic in both processor 910 and interface 914.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 900. More specifically, power source typically interfaces to one or multiple power supplies in system 900 to provide power to the components of system 900. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 900 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board.

Figure 10:
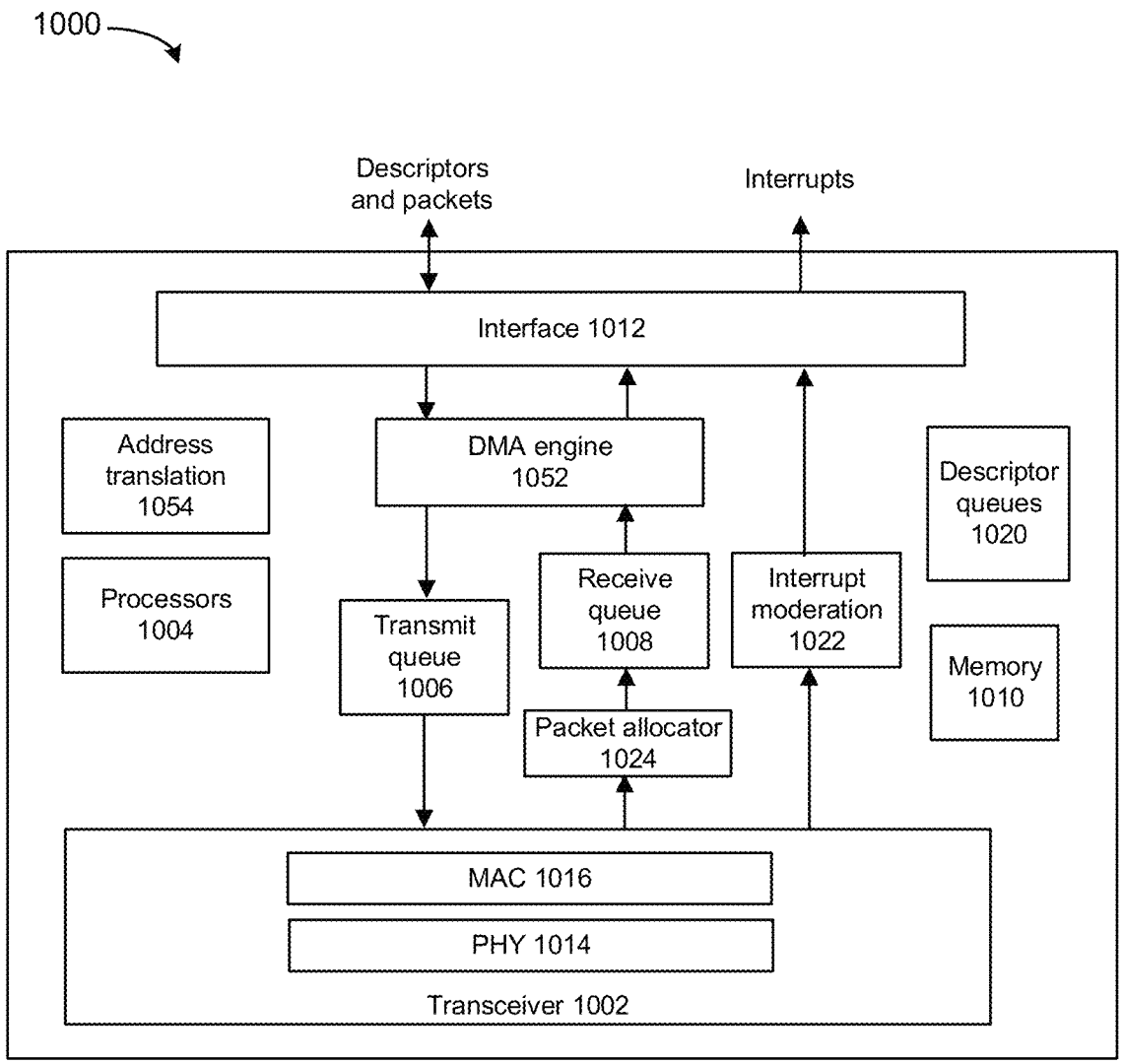
FIG. 10 depicts a network interface that can use embodiments or be used by embodiments.

FIG. 10 depicts a network interface that can use embodiments or be used by embodiments. Transceiver 1002 can be capable of receiving and transmitting packets using any of ports (not shown) in conformance with the applicable protocols such as Ethernet as described in IEEE 802.3-2018, although other protocols may be used. Transceiver 1002 can receive and transmit packets from and to a network via a network medium (not depicted). Transceiver 1002 can include PHY circuitry 1014 and media access control (MAC) circuitry 1016. PHY circuitry 1014 can include encoding and decoding circuitry (not shown) to encode and decode data packets according to applicable physical layer specifications or standards. MAC circuitry 1016 can be configured to assemble data to be transmitted into packets, that include destination and source addresses along with network control information and error detection hash values. MAC circuitry 1016 can be configured to process MAC headers of received packets by verifying data integrity, removing preambles and padding, and providing packet content for processing by higher layers.

Packet allocator 1024 can provide distribution of received packets for processing by multiple CPUs or cores using timeslot allocation described herein or receive side scaling (RSS). When packet allocator 1024 uses RSS, packet allocator 1024 can calculate a hash or make another determination based on contents of a received packet to determine which CPU or core is to process a packet.

Interrupt moderation 1022 can be used to perform interrupt moderation whereby network interface interrupt moderation 1022 waits for multiple packets to arrive, or for a time-out to expire, before generating an interrupt to host system to process received packet(s). Receive Segment Coalescing (RSC) can be performed by network interface whereby portions of incoming packets are combined into segments of a packet. Network interface can store the coalesced packet in memory.

Direct memory access (DMA) engine 1052 can copy a packet header, packet payload, and/or descriptor directly from host memory to the network interface or vice versa, instead of copying the packet to an intermediate buffer at the host and then using another copy operation from the intermediate buffer to the destination buffer. In some embodiments, multiple DMA engines are available for transfer of contents of packets to a destination memory associated with a host device or a destination memory associated with an accelerator device.

Processors 1004 can be any a combination of a: processor, core, graphics processing unit (GPU), field programmable gate array (FPGA), application specific integrated circuit (ASIC), or other programmable hardware device that allow programming of network interface. Processors 1004 can provide accelerator functions such as cryptography (encryption, decryption, public key encryption (PKE), or private key encryption or decryption), data compression (DC), cipher, header processing, authentication capabilities, or other services. For example, a "smart network interface" can provide packet processing capabilities in the network interface using processors 1004. For example, various embodiments can use embodiments described herein to wake-up processors 1004 for use.

Memory 1010 can be any type of volatile or non-volatile memory device and can store any queue or instructions used to program network interface. Transmit queue 1006 can include data or references to data stored in memory for transmission by network interface. Receive queue 1008 can include data or references to data that was received by network interface from a network and stored in memory. Descriptor queues 1020 can include descriptors that reference data or packets in transmit queue 1006 or receive queue 1008 and corresponding destination memory regions.

Bus interface 1012 can provide an interface with a host device (not depicted) using a network, fabric, or direct connection. For example, bus interface 1012 can be compatible with PCI, PCI Express, PCI-x, Serial ATA, and/or USB compatible interface (although other interconnection standards may be used).

Figure 11:
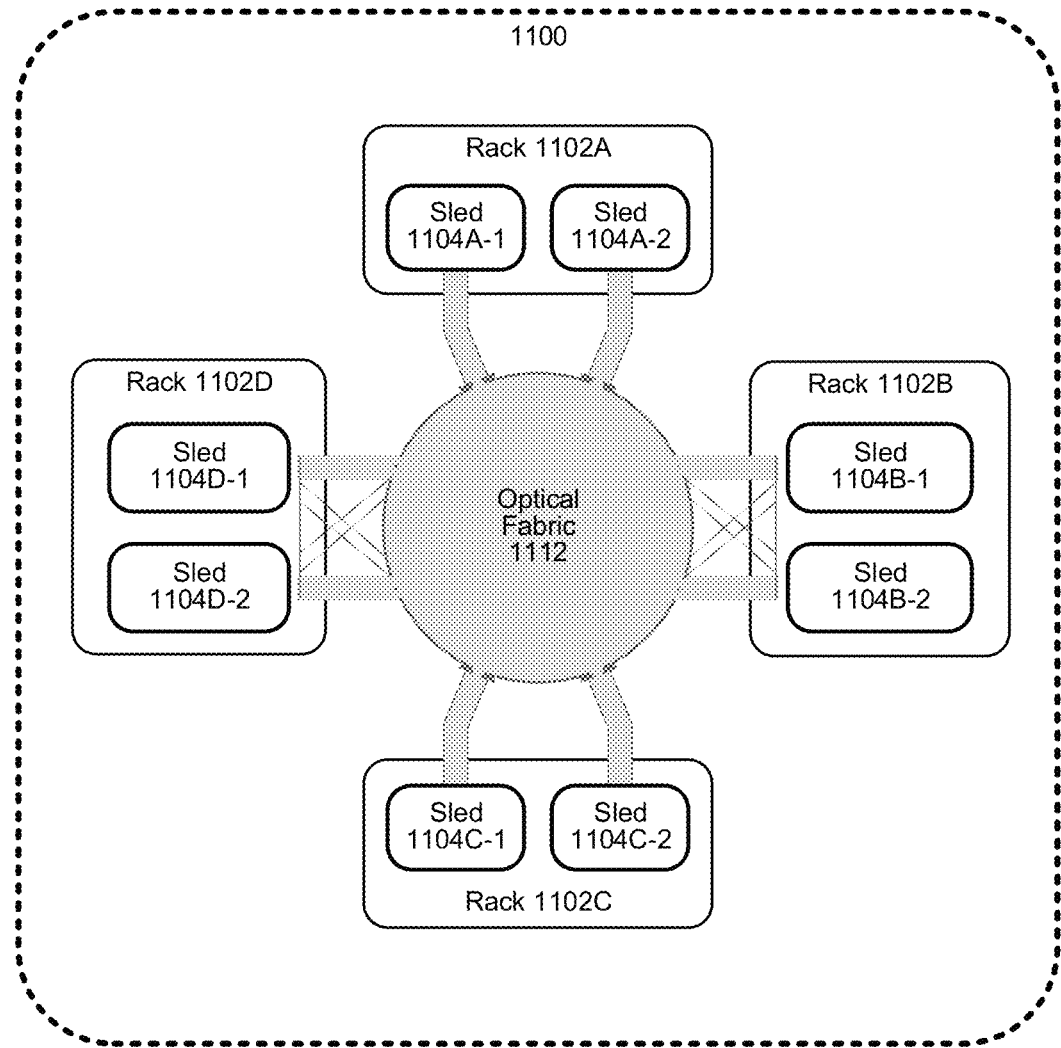
FIG. 11 depicts an example of a data center.

FIG. 11 depicts an example of a data center. Various embodiments can be used in or with the data center of FIG. 11 to receive events and manage function or application wake-ups. As shown in FIG. 11, data center 1100 may include an optical fabric 1112. Optical fabric 1112 may generally include a combination of optical signaling media (such as optical cabling) and optical switching infrastructure via which any particular sled in data center 1100 can send signals to (and receive signals from) the other sleds in data center 1100. The signaling connectivity that optical fabric 1112 provides to any given sled may include connectivity both to other sleds in a same rack and sleds in other racks. Data center 1100 includes four racks 1102A to 1102D and racks 1102A to 1102D house respective pairs of sleds 1104A-1 and 1104A-2, 1104B-1 and 1104B-2, 1104C-1 and 1104C-2, and 1104D-1 and 1104D-2. Thus, in this example, data center 1100 includes a total of eight sleds. Optical fabric 1112 can provide sled signaling connectivity with one or more of the seven other sleds. For example, via optical fabric 1112, sled 1104A-1 in rack 1102A may possess signaling connectivity with sled 1104A-2 in rack 1102A, as well as the six other sleds 1104B-1, 1104B-2, 1104C-1, 1104C-2, 1104D-1, and 1104D-2 that are distributed among the other racks 1102B, 1102C, and 1102D of data center 1100. The embodiments are not limited to this example. For example, fabric 1112 can provide optical and/or electrical signaling.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/ or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes an apparatus comprising: a memory device comprising at least one memory region and a function scheduler to monitor for an access to at least one memory region, wherein in response to an access to the least one memory region, the function scheduler is to write an identification of the accessed memory region into one or more registers and a target function associated with the at least one memory region is to read merely an accessed portion of the least one memory region based on the identification of the accessed portion in the one or more registers.

Example 2 includes any example, wherein the function scheduler is to identify a source that requested a function wake-up and job-related information from a memory region to the one or more registers and comprising a processor, wherein the processor is to execute a monitoring application, the function scheduler is to awaken the monitoring application, and the target function is to access the identification of the source and the job-related information from the one or more registers.

Example 3 includes any example, wherein the function scheduler is to copy information about a source that requested a function wake-up and timer information from a memory region to the one or more registers and comprising a processor, wherein the processor is to execute a monitoring application, the function scheduler is to awaken the monitoring application, and the timer information is to control a time that the target function can execute.

Example 4 includes any example, wherein prior to completion of a timer associated with the timer information, the target function is to complete execution at a point where it does not need to save its context for a next time it is scheduled to run.

Example 5 includes any example, and includes a processor, wherein the processor is to execute a monitoring application to wake up the target function associated with the accessed memory region.

Example 6 includes any example, wherein the function scheduler comprises a MONITOR/MWAIT or memory monitoring device.

Example 7 includes any example, and includes a processor, wherein the processor is to execute a monitoring application to apply a filter to determine whether to wake-up the target function associated with the accessed memory region and wherein if the filter indicates that the target function is not to be awaken based on a source, the monitoring application does not awaken the target function in response to the accessed memory region.

Example 8 includes any example and includes at least one source that is to request a function wake-up to be executed by a monitored memory access, posting interrupt, or another event and comprising a processor, wherein a source include one or more devices, a tenant, a processor-executed software.

Example 9 includes any example, and includes a processor, wherein the processor is to execute a monitoring application to apply a filter to determine whether to wake-up the target function associated with the accessed memory region and wherein if the filter indicates that the target function is not to be awaken based on a commit type, the monitoring application does not awaken the target function in response to the accessed memory region.

Example 10 includes any example, wherein the commit type comprises one or more of: a write to certain monitored least one memory region, write that does not change a monitored at least one memory region, access based on input output coherence, reads, or data is written to memory but a cache line is not flushed.

Example 11 includes any example, wherein the function scheduler is to monitor two or more memory regions and indicate two or more sources of accesses to monitored two or more memory regions.

Example 12 includes any example, wherein the function scheduler is to prioritize waking-up a target function based at least on a priority level of a source of a wake-up request.

Example 13 includes any example, and includes a network interface, data center, server, or rack.

Example 14 includes a computer-implemented method comprising: monitoring access to at least one memory region; detecting an access to a region of at least one memory region; causing a target function associated with the accessed memory region to perform within a single read operation: reading the accessed memory region in the at least one memory region and no other region in the at least one memory region and accessing parameters associated with a job.

Example 15 includes any example, wherein the access comprises one or more of read or write operation.

Example 16 includes any example and includes: monitoring the at least one memory region using a monitoring device; the monitoring device writing an identifier of the accessed memory region and any parameters associated with a job into one or more registers accessible to the target function; and the target function accessing the one or more registers to read the identifier and any parameters.

Example 17 includes any example and includes configuring a monitoring device to apply a filter accesses of the at least one memory region and the monitoring device detecting an access to at least one memory region, wherein the monitoring device is to allow or disallow wake-up of a function associated with an accessed at least one memory region based on the filter.

Example 18 includes any example, wherein the filter identifies a source of memory access or one or more of: write to certain monitored least one memory region, write that does not change a monitored at least one memory region, access based on input output coherence, reads, or data is written to memory but a cache line is not flushed.

Example 19 includes a system comprising: at least one processor; at least one source that is to request a function wake-up to be executed by at least a monitored memory access, posting an interrupt, or another event; a memory device comprising at least one memory region; and a memory monitoring device to monitor access to the at least one memory region, wherein: the memory monitoring device is to identify any access to the at least one memory region and copy an identifier of a specific accessed memory region to the one or more registers, the memory monitoring device is to cause a wake-up of a target function associated with the specific accessed memory region, and the awoken target function is to access merely the specific accessed memory region and the one or more registers to identify a source of the wake-up and parameters associated with a job.

Example 20 includes any example, wherein the access comprises one or more of read or write operation.

Example 21 includes any example, wherein the memory monitoring device is configured to apply a filter of accesses of the at least one memory region and the memory monitoring device is to allow or disallow wake-up of a function associated with an accessed at least one memory region based on the filter.

Example 22 includes any example, wherein the parameters comprise one or more of: information about a source that requested the wake-up and timer information and comprising a function scheduler, wherein a processor is to execute a monitoring application and the function scheduler is to awaken the monitoring application and direct the monitoring application to read the accessed memory region and identification of the source that requested the wake-up and timer information and provide the timer information to the awoken target function to control a time that the awoken target function can execute.

What is claimed is:

1. An apparatus comprising:
   a memory device comprising at least one memory region;
   circuitry to monitor for an access to the at least one memory region, wherein in response to an access to the least one memory region, the circuitry is to write an identification of the accessed at least one memory region into one or more registers and a target function associated with the at least one memory region is to read merely an accessed portion of the least one memory region based on the identification of the accessed portion in the one or more registers, wherein the circuitry is to copy information about a source that requested a function wake-up and timer information to the one or more registers; and
   a processor, wherein
   the processor is to execute a monitoring application,
   the circuitry is to awaken the monitoring application, and
   the timer information is to control a time that the target function is to execute.

2. The apparatus of claim 1, wherein the circuitry is to identify a source that requested a function wake-up and job-related information from a memory region to the one or more registers, wherein
   the processor is to execute a monitoring application,
   the circuitry is to awaken the monitoring application, and
   the target function is to access the identification of the source and the job-related information from the one or more registers.

3. The apparatus of claim 1, wherein prior to completion of a timer associated with the timer information, the target function is to complete execution at a point where it does not save its context for a next time the target function is scheduled to execute.

4. The apparatus of claim 1, wherein the processor-executed monitoring application is to wake up the target function associated with the accessed at least one memory region.

5. The apparatus of claim 1, wherein the circuitry comprises a MONITOR/MWAIT device or memory monitoring device.

6. The apparatus of claim 1, wherein the processor-executed monitoring application is to apply a filter to determine whether to wake-up the target function associated with the accessed at least one memory region and wherein if the filter indicates that the target function is not to be awaken based on a source, the monitoring application does not awaken the target function in response to the accessed at least one memory region.

7. The apparatus of claim 1, comprising at least one source that is to request a function wake-up to be executed by a monitored memory access or posted interrupt, wherein at least one of the at least one source includes one or more devices, a tenant, a processor-executed software.

8. The apparatus of claim 1, wherein the processor-executed monitoring application is to apply a filter to determine whether to wake-up the target function associated with the accessed at least one memory region and wherein if the filter indicates that the target function is not to be awaken based on a commit type, the monitoring application does not awaken the target function in response to the accessed at least one memory region.

9. The apparatus of claim 8, wherein the commit type comprises one or more of: a write to certain monitored least one memory region, write that does not change a monitored at least one memory region, access based on input output coherence, reads, or data is written to memory but a cache line is not flushed.

10. The apparatus of claim 1, wherein the circuitry is to monitor two or more memory regions and indicate two or more sources of accesses to monitored two or more memory regions.

11. The apparatus of claim 1, wherein the circuitry is to prioritize waking-up a target function based at least on a priority level of a source of a wake-up request.

12. The apparatus of claim 1, comprising a network interface, data center, server, or rack.

13. The apparatus of claim 1, wherein the circuitry is to awaken the monitoring application based on the access to the at least one memory region.

14. The apparatus of claim 1, wherein to monitor for an access to the at least one memory region is consistent with MONITOR and/or MWAIT.

15. A computer-implemented method comprising:
monitoring access to at least one memory region;
detecting an access to a region of the at least one memory region;
based on detected access to the at least one memory region, allowing or disallowing wake-up of a function associated with an accessed at least one memory region based on a configured filter; and
causing a target function associated with the accessed memory region to perform within a single read operation:
reading the accessed memory region in the at least one memory region and no other region in the at least one memory region and
accessing parameters associated with a job.

16. The method of claim 15, wherein the access comprises one or more of read or write operation.

17. The method of claim 15, comprising:
monitoring the at least one memory region using a monitoring device;
the monitoring device writing an identifier of the accessed memory region and one or more parameters associated with a job into one or more registers accessible to the target function; and
the target function accessing the one or more registers to read the identifier and one or more parameters.

18. The method of claim 15, wherein the filter identifies a source of memory access or one or more of: write to certain monitored least one memory region, write that does not change a monitored at least one memory region, access based on input output coherence, read from the monitored at least one memory region, or data is written to memory but a cache line is not flushed.

19. The method of claim 15, wherein the monitoring access to at least one memory region and the causing a target function associated with the accessed memory region to perform within a single read operation: reading the accessed memory region in the at least one memory region and no other region in the at least one memory region and accessing parameters associated with a job are consistent with MONITOR and/or MWAIT.

20. A system comprising:
at least one processor;
at least one source that is to request a function wake-up to be executed by at least a monitored memory access or posting an interrupt;
a memory device comprising at least one memory region; and
a circuitry to monitor access to the at least one memory region, wherein:
the circuitry is to identify an access to the at least one memory region and copy an identifier of a specific accessed memory region to the one or more registers,
the circuitry is to cause a wake-up of a target function associated with the specific accessed memory region, and
the awaken target function is to access merely the specific accessed memory region and the one or more registers to identify a source of the wake-up and parameters associated with a job, wherein the parameters comprise timer information,
a processor of the at least one processor is to execute a monitoring application and the circuitry is to awaken the monitoring application and direct the monitoring application to read the accessed memory region and identification of the source that requested the wake-up and the timer information and provide the timer information to the awaken target function to control a time that the awaken target function can execute.

21. The system of claim 20, wherein the access comprises one or more of read or write operation.

22. The system of claim 20, wherein the circuitry is configured to apply a filter of accesses of the at least one memory region and the circuitry is to allow or disallow wake-up of a function associated with an accessed at least one memory region based on the filter.

23. The system of claim 20, wherein the monitor access to the at least one memory region and the awaken the monitoring application are in accordance with MONITOR and/or MWAIT.

* * * * *

UNITED STATES PATENT AND TRADEMARK OFFICE
CERTIFICATE OF CORRECTION

PATENT NO. : 11,640,305 B2
APPLICATION NO. : 16/524004
DATED : May 2, 2023
INVENTOR(S) : Alexander Bachmutsky et al.

Page 1 of 1

It is certified that error appears in the above-identified patent and that said Letters Patent is hereby corrected as shown below:

In the Claims

Column 26, Lines 26-27 Claim 20 delete "an identifier of a specific accessed memory region to the one or more registers" insert --an identifier of a specific accessed memory region to one or more registers--

Signed and Sealed this
Twenty-seventh Day of June, 2023

Katherine Kelly Vidal
*Director of the United States Patent and Trademark Office*